US011901985B2

(12) United States Patent
Awoniyi-Oteri et al.

(10) Patent No.: US 11,901,985 B2
(45) Date of Patent: Feb. 13, 2024

(54) POSE-BASED BEAMFORMING TECHNIQUES FOR WIRELESS COMMUNICATIONS

(71) Applicant: QUALCOMM Incorporated, San Diego, CA (US)

(72) Inventors: Olufunmilola Omolade Awoniyi-Oteri, San Diego, CA (US); Yan Zhou, San Diego, CA (US); Tao Luo, San Diego, CA (US); Wanshi Chen, San Diego, CA (US); Junyi Li, Fairless Hills, PA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/389,184

(22) Filed: Jul. 29, 2021

(65) Prior Publication Data
US 2023/0033336 A1 Feb. 2, 2023

(51) Int. Cl.
*H04B 7/06* (2006.01)
*H04B 7/0408* (2017.01)
(Continued)

(52) U.S. Cl.
CPC ......... *H04B 7/0617* (2013.01); *H04B 7/0408* (2013.01); *H04B 7/0456* (2013.01); *H04W 4/027* (2013.01); *H04W 16/28* (2013.01)

(58) Field of Classification Search
CPC .. H04B 7/0617; H04B 7/0408; H04B 7/0456; H04B 7/063; H04B 7/0695; H04B 7/086; H04B 7/088; H04W 4/027; H04W 16/28
See application file for complete search history.

(56) References Cited

U.S. PATENT DOCUMENTS 11,265,857 B1 * 3/2022 Alizadeh ............ H04B 7/0695
2011/0241931 A1 * 10/2011 Krich .................. G01S 7/2813
342/159

(Continued)

FOREIGN PATENT DOCUMENTS

WO WO-2021023830 A1 2/2021

OTHER PUBLICATIONS

International Search Report and Written Opinion—PCT/US2022/073335—ISA/EPO—Oct. 20, 2022 (2106375WO).

*Primary Examiner* — Tejis Daya
(74) *Attorney, Agent, or Firm* — Holland & Hart / Qualcomm

(57) ABSTRACT

Methods, systems, and devices for wireless communications are described for beam selection based on user pose information provided by an extended reality (XR) application. The pose information may be used to determine a position of the UE, and one or more beam parameters may be requested based on the position of the UE. The position information of the UE may include position information for a current time period, predictive position information for one or more future time periods, or any combinations thereof. The UE may transmit a beam request to a base station for one or more beams for the current time period, for one or more future time periods, or any combinations thereof. The UE may request a switch between beams of differing beamwidths or having the same beamwidth, or request a change of a beamwidth of an existing beam.

29 Claims, 21 Drawing Sheets

(51) Int. Cl.
*H04B 7/0456* (2017.01)
*H04W 4/02* (2018.01)
*H04W 16/28* (2009.01)

(56) References Cited

U.S. PATENT DOCUMENTS

| | | | |
|---|---|---|---|
| 2013/0072247 A1* | 3/2013 | Park | H04L 5/0057 |
| | | | 455/513 |
| 2014/0185481 A1* | 7/2014 | Seol | H04W 52/24 |
| | | | 370/252 |
| 2019/0182093 A1* | 6/2019 | Jayawardene | H04L 27/2695 |
| 2021/0194560 A1* | 6/2021 | Denis | H04B 17/382 |
| 2022/0271810 A1* | 8/2022 | Loghin | H04B 7/0617 |
| 2022/0286827 A1* | 9/2022 | Cheng | H04W 76/27 |
| 2022/0400429 A1* | 12/2022 | Beyene | G06F 9/45558 |
| 2023/0006747 A1* | 1/2023 | Zander | H04B 17/345 |

\* cited by examiner

POSE-BASED BEAMFORMING TECHNIQUES FOR WIRELESS COMMUNICATIONS

FIELD OF TECHNOLOGY

The following relates to wireless communications, including pose-based beamforming techniques for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). These communication devices may support various extended reality (XR) applications, such as augmented reality (AR), mixed reality (MR), and virtual reality (VR). In XR applications, communication devices may generate and send pose information relating to a user and other control information to provide visual rendering and to avoid visual conflicts, such as misaligning objects between real and virtual environments. In some cases, transmission of the pose information and other control information by these communication devices may be latency sensitive, where increased latency may result in degraded user experience.

SUMMARY

The described techniques relate to improved methods, systems, devices, and apparatuses that support pose-based beamforming techniques for wireless communications. In accordance with various aspects, a user equipment (UE) may run an extended reality (XR) application that may provide user pose information for one or multiple time intervals. The pose information may be used to determine a position of the UE, and one or more beam parameters may be requested based on the position of the UE. In some cases, the position information of the UE may include position information for a current time period, predictive position information for one or more future time periods, other information, or any combinations thereof. The UE may transmit a beam request to a base station that requests one or more beams for the current time period, for one or more future time periods, or any combinations thereof. In some cases, the UE may request a switch between beams of differing beamwidths, such as between a wide beamwidth layer one (L1) beam and a narrower beamwidth layer three (L3) beam. Additionally, or alternatively, the UE may request a beamwidth change of an existing beam.

A method for wireless communications at a user equipment (UE) is described. The method may include transmitting, to a base station, a beam request for a first beam having one or more requested beam parameters for beamformed communications between the base station and the UE, the requested beam parameters based on user position information associated with an extended reality application at the UE, receiving, from the base station, a first beam configuration responsive to the beam request, and communicating with the base station using the first beam configuration.

An apparatus for wireless communications at a UE is described. The apparatus may include a processor, memory coupled with the processor, and instructions stored in the memory. The instructions may be executable by the processor to cause the apparatus to transmit, to a base station, a beam request for a first beam having one or more requested beam parameters for beamformed communications between the base station and the UE, the requested beam parameters based on user position information associated with an extended reality application at the UE, receive, from the base station, a first beam configuration responsive to the beam request, and communicate with the base station using the first beam configuration.

Another apparatus for wireless communications at a UE is described. The apparatus may include means for transmitting, to a base station, a beam request for a first beam having one or more requested beam parameters for beamformed communications between the base station and the UE, the requested beam parameters based on user position information associated with an extended reality application at the UE, means for receiving, from the base station, a first beam configuration responsive to the beam request, and means for communicating with the base station using the first beam configuration.

A non-transitory computer-readable medium storing code for wireless communications at a UE is described. The code may include instructions executable by a processor to transmit, to a base station, a beam request for a first beam having one or more requested beam parameters for beamformed communications between the base station and the UE, the requested beam parameters based on user position information associated with an extended reality application at the UE, receive, from the base station, a first beam configuration responsive to the beam request, and communicate with the base station using the first beam configuration.

In some examples of the method, apparatuses, and non-transitory computer-readable medium described herein, the user position information includes pose parameters provided by the extended reality application that include one or more of position information of the UE relative to a reference position, orientation information of the UE relative to a reference orientation, rotational movement information of the UE relative to one or more axes of rotation, translational movement information relative to one or more axes of translation, or any combinations thereof. In some examples of the method, apparatuses, and non-transitory computer-readable medium described herein, the pose parameters include one or more current pose parameters for a current time period, one or more predictive pose parameters for one or more future time periods, or any combinations thereof.

In some examples of the method, apparatuses, and non-transitory computer-readable medium described herein, the transmitting the beam request may include operations, features, means, or instructions for transmitting a switch request to switch from an existing beam to the first beam, where the existing beam and the first beam are included in a set of multiple configured base station beams that include one or more layer one beams, one or more layer three beams, or any combinations thereof, and where the one or more layer three beams have a narrower beamwidth than the one or more layer one beams. In some examples of the method, apparatuses, and non-transitory computer-readable medium described herein, the switch request is for switching between two layer three beams based on a movement rate associated with the user position information being at or below a threshold value, and is for switching to a layer one beam based on the movement rate exceeding the threshold value. In some examples of the method, apparatuses, and non-transitory computer-readable medium described herein, the transmitting the beam request may include operations, features, means, or instructions for transmitting a beamwidth update request to change a beamwidth of the first beam to be a wider beamwidth or a narrower beamwidth than an existing beamwidth of the first beam.

Some examples of the method, apparatuses, and non-transitory computer-readable medium described herein may further include operations, features, means, or instructions for identifying a set of pose parameters associated with the user position information and determining the one or more requested beam parameters based on a mapping between the set of pose parameters and a set of available beam parameters. In some examples of the method, apparatuses, and non-transitory computer-readable medium described herein, the one or more requested beam parameters are based on an adaptive model of a channel between the UE and the base station and the set of pose parameters. In some examples of the method, apparatuses, and non-transitory computer-readable medium described herein, the set of available beam parameters are included in a codebook of beams provided by the base station. In some examples of the method, apparatuses, and non-transitory computer-readable medium described herein, the set of available beam parameters are determined at the UE based on measurements of received signals from the base station.

Some examples of the method, apparatuses, and non-transitory computer-readable medium described herein may further include operations, features, means, or instructions for storing a set of multiple measurements of one or more signals from the base station for a set of multiple different pose parameters associated with a set of multiple different user position information and determining the one or more requested beam parameters based on one or more current pose parameters and the set of multiple measurements. In some examples of the method, apparatuses, and non-transitory computer-readable medium described herein, the one or more requested beam parameters indicate a request for a beamwidth adjustment of the first beam by a determined step value. Some examples of the method, apparatuses, and non-transitory computer-readable medium described herein may further include operations, features, means, or instructions for measuring a reference signal that is transmitted using an adjusted first beam having the beamwidth adjustment and determining, based on the measuring, to request a further beamwidth adjustment to further refine the first beam.

In some examples of the method, apparatuses, and non-transitory computer-readable medium described herein, the beam request includes one or more of a requested transmission configuration indicator (TCI) state associated with the first beam, the determined step value for beamwidth adjustment of the first beam, a relative direction between the UE and the base station, or any combinations thereof. In some examples of the method, apparatuses, and non-transitory computer-readable medium described herein, the beam request includes a request for a sequence of beams for two or more future time periods, based on predictive user position information associated with the two or more future time periods. In some examples of the method, apparatuses, and non-transitory computer-readable medium described herein, the predictive user position information is determined at a beam prediction engine based on a set of predicted pose parameters provided by the extended reality application running at an application layer of the UE.

Some examples of the method, apparatuses, and non-transitory computer-readable medium described herein may further include operations, features, means, or instructions for receiving, from the base station, configuration information that enables transmission of the beam request based on the user position information, and that configures shared channel or control channel signaling for communication of beam requests and beam configurations.

A method for wireless communications at a base station is described. The method may include receiving, from a UE, a beam request for a first beam having one or more requested beam parameters for beamformed communications with the UE, the requested beam parameters based on user position information associated with an extended reality application at the UE, transmitting, to the UE, a first beam configuration responsive to the beam request, and communicating with the UE using the first beam configuration.

An apparatus for wireless communications at a base station is described. The apparatus may include a processor, memory coupled with the processor, and instructions stored in the memory. The instructions may be executable by the processor to cause the apparatus to receive, from a UE, a beam request for a first beam having one or more requested beam parameters for beamformed communications with the UE, the requested beam parameters based on user position information associated with an extended reality application at the UE, transmit, to the UE, a first beam configuration responsive to the beam request, and communicate with the UE using the first beam configuration.

Another apparatus for wireless communications at a base station is described. The apparatus may include means for receiving, from a UE, a beam request for a first beam having one or more requested beam parameters for beamformed communications with the UE, the requested beam parameters based on user position information associated with an extended reality application at the UE, means for transmitting, to the UE, a first beam configuration responsive to the beam request, and means for communicating with the UE using the first beam configuration.

A non-transitory computer-readable medium storing code for wireless communications at a base station is described. The code may include instructions executable by a processor to receive, from a UE, a beam request for a first beam having one or more requested beam parameters for beamformed communications with the UE, the requested beam parameters based on user position information associated with an extended reality application at the UE, transmit, to the UE, a first beam configuration responsive to the beam request, and communicate with the UE using the first beam configuration.

In some examples of the method, apparatuses, and non-transitory computer-readable medium described herein, the beam request includes a request for two or more beams for two or more future time periods. In some examples of the method, apparatuses, and non-transitory computer-readable medium described herein, the beam request includes a switch request to switch from an existing beam to the first beam, where the existing beam and the first beam are included in a set of multiple configured beams of the base station that include one or more layer one beams, one or more layer three beams, or any combinations thereof, and where the one or more layer three beams have a narrower beamwidth than the one or more layer one beams. In some examples of the method, apparatuses, and non-transitory computer-readable medium described herein, the beam request includes a request to change a beamwidth of the first beam to be a wider beamwidth or a narrower beamwidth than an existing beamwidth of the first beam. In some examples of the method, apparatuses, and non-transitory computer-readable medium described herein, the first beam configuration is determined based on an iterative process of beamwidth adjustments using a determined step value of beamwidth changes for each iteration of the iterative process.

DETAILED DESCRIPTION

Figure 1:
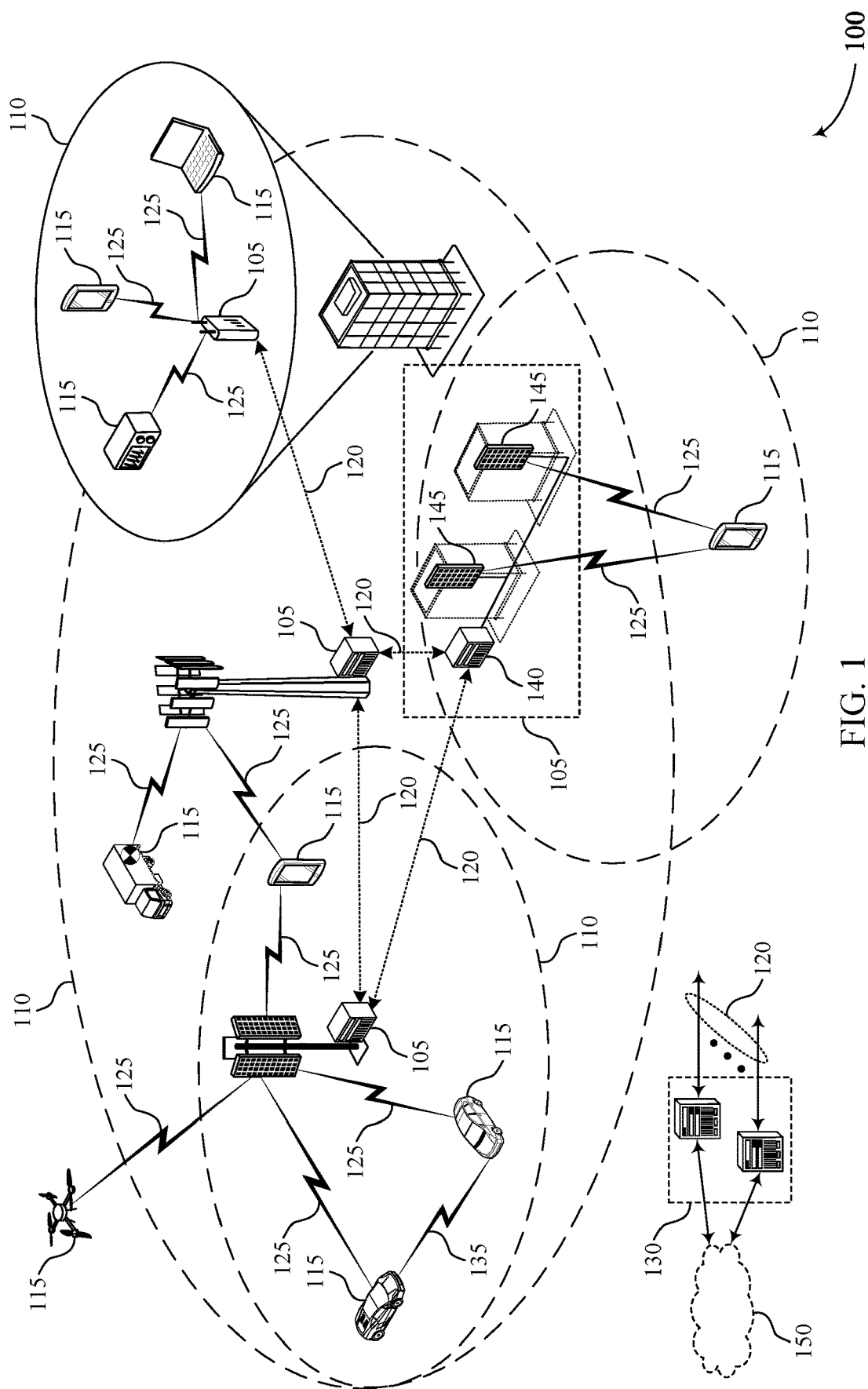
FIG. 1 illustrates an example of a wireless communications system that supports pose-based beamforming techniques for wireless communications in accordance with aspects of the present disclosure.

Some wireless communication systems, such as fifth generation (5G) New Radio (NR) systems, support beamformed communications in which devices share information via directional communication beams. In some cases, a user equipment (UE) and a base station may establish communications using a particular directional beam, and movement of the UE may necessitate a beam switch in the event that the established beam no longer provides a reliable channel subsequent to the movement of the UE. In some cases UE movement may occur relatively quickly, and thus channel metrics associated with beams may also change relatively quickly.

For example, in some extended reality (XR) applications (e.g., virtual reality (VR), augmented reality (AR), or mixed reality (MR)), features from the real and virtual environments may be overlaid and displayed to a user via the UE (e.g., an XR headset or goggles). To avoid visual conflicts, such as misaligning objects from the real and virtual environments and other visual conflicts, the UE may sense, generate, and send pose information relating to a user to a network (e.g., a server hosting the XR application that is accessed via a base station). Such communications may thus be relatively latency sensitive and also may contain relatively large amounts of data, and higher band communications using directional beams (e.g., using millimeter wave (mmW) communications) may be desirable. Various techniques as discussed herein provide for efficient beam selection and switching in cases where beam parameters may change relatively quickly.

In some cases, a UE may use pose information relating to a user from an XR application to determine a beam for use in communications with a base station, and transmit a beam update request to the base station based on such a determination. In some cases, the UE may use predictive pose information to request one or more beams (e.g., a sequence of beams) based on predicted UE position information in one or more future time periods. The beam update request may include a request for switching between relatively narrow beamwidth beams (e.g., layer three (L3) beams), for switching between a relatively wide beam (e.g., a layer one (L1) beam) and a relatively narrow beamwidth beam (e.g., a L3 beam), a request for changing a beamwidth of an existing beam used for communications, or any combinations thereof. In some cases, a beam management and configuration engine at the UE may use a model (e.g., an artificial intelligence (AI) based model) of wireless channel parameters and pose information to determine beam updates. In some cases, the model may use a codebook of beams that is provided by the base station, or may learn a beam configuration based on measurements at the UE, and XR pose information may be mapped to different beams using machine learning. In some cases, beamwidth may be adjusted using an iterative process based on a predefined step increase/decrease in beamwidth for each iteration until a beam solution converges.

Aspects of the subject matter described in this disclosure may be implemented to realize one or more of the following potential improvements, among others. The techniques employed by the UE may provide benefits and enhancements to the operation of the UE, base station, one or more other network components, or any combinations thereof. For example, operations performed by the UE may provide enhanced reliability for communications (e.g., through beam management that provides more reliable channel quality). In some examples, UE beam requests may be configured to allow for increased overall channel metrics, which may promote higher reliability and lower latency for XR-related operations, and enhanced user experience, among other benefits. Further, UE indication of predictive beam parameters may allow for scheduling of more reliable beams, which may further promote higher reliability, lower latency, and enhance user experience and overall network capacity.

Aspects of the disclosure are initially described in the context of wireless communications systems. Aspects of the disclosure are further illustrated by and described with reference to XR devices that use beamforming, process flows, apparatus diagrams, system diagrams, and flowcharts that relate to pose-based beamforming techniques for wireless communications.

FIG. 1 illustrates an example of a wireless communications system 100 that supports pose-based beamforming techniques for wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

The base station 105 and the UE 115 may support various types of applications that may have periodic or semi-periodic data traffic. The base station 105 may be in wireless communication with a server (e.g., a server that is included in or connected with the wireless communications system 100), which may provide the periodic or semi-periodic data traffic to the base station 105 to forward to the UE 115. Likewise, the UE 115 may provide the periodic or semi-periodic data traffic to the base station 105 to forward to the server. The server may be a cloud server, a server associated with an application subscription provider, proxy server, web server, application server, or any combination thereof. The server may include an application distribution platform. The application distribution platform may allow the UE 115 to discover, browse, share, and download applications via the base station 105, and therefore provide a digital distribution of the application from the application distribution platform. As such, a digital distribution may be a form of delivering content such as data, without the use of physical media but over online delivery mediums, such as the Internet. For example, the UE 115 may upload or download applications for streaming, downloading, uploading, or processing, data (e.g., images, audio, video). The server may also transmit to the UE 115 a variety of information, such as instructions or commands to download applications on the UE 115 via the base station 105.

By way of example, the base station 105 and the UE 115 may support XR applications, which may have periodic or semi-periodic XR data traffic. An XR application may support various frame rates, for example 60 MHz frame rates or 120 MHz frame rates. The server and UE 115 may generate an XR frame at 60 MHz, which may correspond to a periodicity of 16.67 ms. Alternatively, the server and UE 115 may generate an XR frame at 120 MHz, which may correspond to a periodicity of 8.33 ms. The server may transmit the periodic or semi-periodic XR data traffic to the base station 105, which may forward the XR data traffic to the UE 115, and likewise the UE 115 may transmit the periodic or semi-periodic XR data traffic to the base station 105, which may forward the XR data traffic to the server. The XR data traffic may be divided into multiple slices (also referred to as files) and each slice encoded and transmitted separately to the base station 105, which may forward the XR data traffic using multiple TBs (also referred to as a burst of TBs).

For XR applications features from the real and virtual environments may be overlaid and displayed to a user for consumption via the UE 115. To avoid visual conflicts, such as misaligning objects from the real and virtual environments, among other visual conflicts, the UE 115 may generate and send pose information to a network (e.g., a server hosting the XR application). The pose information may define a position and orientation of the UE 115 (or user) in space relative to the real and virtual environments. In some cases, different applications may have different uplink data flows.

For VR applications there may be a single uplink data flow. For example, the UE 115 may generate pose information (e.g., six degree of freedom (6DOF) pose information) and other control information. In some examples, the UE 115 may generate or transmit the pose information based on a data rate (e.g., 0.5-2 Mbps). The UE 115 may transmit the pose information and other control information based on an uplink transmit periodicity that may correspond to the frame rate (e.g., per frame or per some defined number of frames). In some examples, the pose information and other control information may have different file sizes (e.g., 0.5 Mbit/500=1 Kbit=125 byte, 2 Mbit/500=4 Kbit=500 byte).

For AR applications there may be two uplink data flows. As part of the first uplink data flow, the UE 115 may generate pose information (e.g., 6DOF pose information) and other control information. The UE 115 may generate or transmit the pose information based on a data rate (e.g., 0.5-2 Mbps). The UE 115 may transmit the pose information and other control information based on an uplink transmit periodicity. As part of the second uplink data flow, the UE 115 may generate pose information for a scene update associated with the AR applications. For scene updates, the UE 115 may generate or transmit the pose information based on a data rate (e.g., 10 Mbps at 10 Hz). In some examples, the pose information may have different file sizes (e.g., 1 Mbits per 100 ms=125 kbyte).

In some cases, the UE 115 may benefit from the periodic or semi-periodic data traffic, and more specifically from the transmission delay between bursts of TBs carrying the periodic or semi-periodic data traffic to implement various operations to reduce power consumption. The UE 115 may send the pose information and/or other control information in accordance with a configured grant, a dynamic grant, or a proactive grant, which, in some cases, may configure the UE 115 with a set of parameters to use when transmitting the pose information and/or other control information to the network. In some cases, the UE 115 may use the pose information to determine beam parameters for beamformed communications, and different beams may be requested based on the pose information, changes in the pose information, a rate of change of pose information, or any combinations thereof. Various aspects of the present disclosure relate to UE 115 transmission of beam requests based on pose information, which may allow for efficient beam selection for communications at the UE 115, which may result in improved reliability and latency for XR applications, and reduced power consumption for the UE 115.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more UEs 115 may run an XR application that may provide user pose information for one or multiple time intervals. The pose information may be used to determine position information of the UE 115, and one or more beam parameters may be requested based on position information of the UE 115. In some cases, the position information of the UE 115 may include position information for a current time period, predictive position information for one or more future time periods, or any combinations thereof. The UE 115 may transmit a beam request to a base station 105 that requests one or more beams for the current time period, for one or more future time periods, or any combinations thereof. In some cases, the UE 115 may request a switch between beams of differing beamwidths, such as between a wide beamwidth L1 beam and a narrower beamwidth L3 beam. Additionally, or alternatively, the UE may request a beamwidth change of an existing beam.

Figure 2:
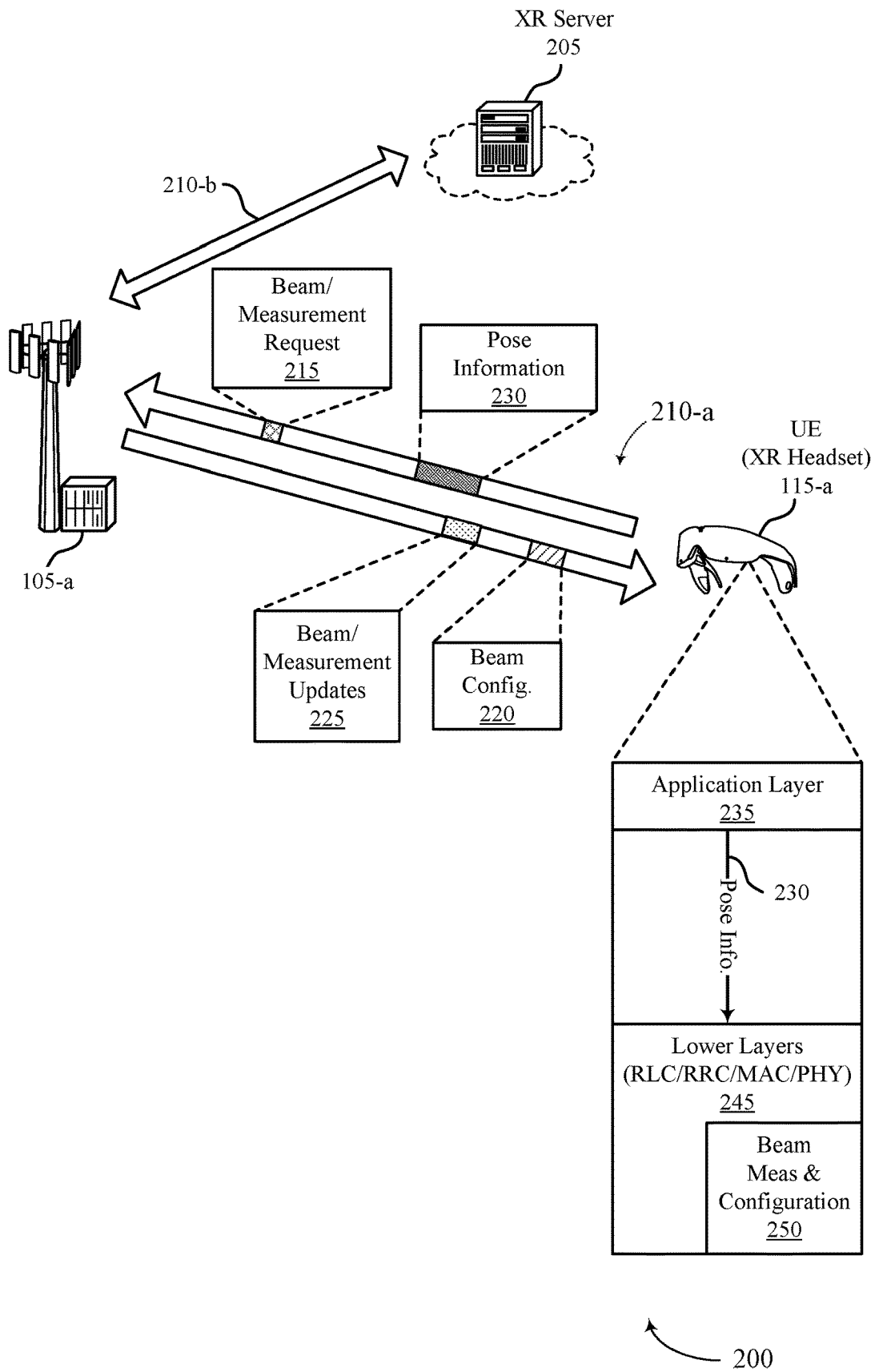
FIG. 2 illustrates an example of a portion of a wireless communications system that supports pose-based beamforming techniques for wireless communications in accordance with aspects of the present disclosure.

FIG. 2 illustrates an example of a wireless communications system 200 that supports pose-based beamforming techniques for wireless communications in accordance with aspects of the present disclosure. In some examples, wireless communications system 200 may implement aspects of wireless communications system 100. The wireless communications system 200 may include a UE 115-*a*, a base station 105-*a*, which may be examples of UEs 115 and base stations 105, as described with reference to FIG. 1, and an XR server 205.

The UE 115-*a* may communicate with the base station 105-*a* using a communication link 210-*a*. In some cases, the communication link 210-*a* may include an example of an access link (e.g., a Uu link). The communication link 210-*a* may include a bi-directional link that can include both uplink and downlink communication. For example, the UE 115-*a* may transmit uplink transmissions, such as uplink control signals (e.g., beam or measurement request message 215) or uplink data signals (e.g., XR-related information such as pose information 230), to the base station 105-*a* using the communication link 210-*a*. The base station 105-*a* may transmit downlink transmissions, such as beam configuration messages 220, beam or measurement updates 225, other downlink control information (DCI), downlink data signals (e.g., PDSCH transmissions), or combinations thereof, to the UE 115-*a* using the communication link 210-*a*.

Similarly, the base station 105-*a* may communicate with the XR server 205 using a communication link 210-*b*. Moreover, the UE 115-*a* may communicate with the XR server 205 through the base station 105-*a* (e.g., via communication links 210-*a* and 210-*b*). For example, the UE 115-*a* may transmit pose information 230 to the base station 105-*a* via the communication link 210-*a*, where the base station 105-*a* may relay or forward the pose information 230 to the XR server 205 for processing. The communication links 210-*a* and 210-*b* may include unidirectional communication links and/or bidirectional communications links. In the context of an XR application, the UE 115-*a* may transmit uplink data associated with the XR application (e.g., pose information 230, control information, scene information) to the XR server 205 via communication links 210-*a* and 210-*b*. The XR server 205 may then encode and render XR frames based on the received information, and may transmit XR frames to the base station 105-*a* via communication link 210-*b*. Subsequently, the base station 105-*a* may transmit downlink data (e.g., XR frames, XR frame bursts) to the UE 115-*a* via communication link 210-*a*.

As discussed herein, the UE 115-*a* may in some cases, run an XR application at an application layer 235 of the UE 115-*a*. In this example, the UE 115-*a* may be an untethered XR headset (e.g., XR goggles) that includes components for wireless communications with base station 105-*a*, such as antennas (e.g., FR1 antennas and mmW antennas), transmit/receive components, and associated processing components. In some cases, the UE 115-*a* may include components for multiple different radio access technologies (RATs), including components for communications using 5G or 4G protocols, Ultra Mobile Broadband (UMB), Institute of Electrical and Electronics Engineers (IEEE) 802.11 (Wi-Fi), IEEE 802.16 (WiMAX), IEEE 802.20, Flash-OFDM, or any combinations thereof. The application layer 235, in some cases, may provide pose information 230 to one or more lower layers 245 (e.g., RLC, RRC, MAC, PHY layers) that may use pose information 230 to determine one or more beam parameters. In this example, a beam measurement and configuration engine 250 may use the pose information 230 to determine to request a beam switch or beam adjustment. For example, for XR traffic carried over mmW (e.g., FR2) networks, the pose information 230 may be used to identify or predict that beam updates may be beneficial the UE 115-*a*. For example, for split rendering XR application, the UE 115-*a* may send head poses to the XR server 205 periodically which in term renders the appropriate scene and sends the scene to the UE 115-*a* through the base station 105-*a*.

The pose information 230 may define a position and orientation of the UE 115-*a* (or user) in space relative to the real and virtual environments. The UE 115-*a* may send the pose information and/or other control information according to a periodicity that is associated with a frame rate of an XR application at the application layer 235. In some cases, the UE 115-*a* may be provided with a configured grant that may allocate periodic resources (also referred to as configured grant resources), which the UE 115-*a* may use for downlink reception or uplink transmission, or both. Configured grants may be provided, in some cases, in radio resource control (RRC) signaling. In other cases, the base station 105-*a* may provide dynamic grants to the UE 115-*a*, which may be based on a scheduling request (SR), a buffer status report (BSR), or combinations thereof, that may be transmitted by the UE 115-*a*. In further cases, the base station 105-*a* may provide proactive grants (PGs) to the UE 115-*a* based on expected uplink data to be transmitted by the UE 115-*a*, and PGs may be dynamically indicated by the base station 105-*a* without an SR indication.

In some cases, the UE 115-*a* may use the pose information 230 to determine a beam for use in communications with base station 105-*a*, and transmit the beam or measurement request message 215 to the base station 105-*a* based on such a determination. In some cases, the XR application running at the application layer 235 may perform predictive pose techniques and the pose information 230 may include predictive information for one or more future time periods (e.g., for one or more 25 ms time periods). The UE 115-*a* may use the pose information 230 to determine UE position information that may be used to request one or more beams (e.g., a sequence of beams) based on current or predicted UE 115-*a* position information. The beam or measurement request message 215 may include a request for switching between relatively narrow beamwidth beams (e.g., L3 beams), for switching between a relatively wide beam (e.g., an L1 beam) and an L3 beam, a request for changing a beamwidth of an existing beam used for communications, or any combinations thereof.

In some cases, the beam measurement and configuration engine 250 may use a model (e.g., an AI-based model) of wireless channel parameters and pose information to determine beam updates. In some cases, the model may use a codebook of beams that is provided by the base station, or may learn a beam configuration based on measurements at the UE 115-a, and XR pose information may be mapped to different beams using machine learning. In some cases, a machine learning algorithm may be trained at the UE 115-a based on a set of training data that may be provided to the UE 115-a. In some cases, the base station 105-a may configure a particular AI algorithm that is to be used at the UE 115-a (e.g., based on a type of communications, frequency range of communications, information from the XR server 205, etc.). In some cases, the beam or measurement request message 215 may include a request for a beamwidth to be adjusted, and the base station 105-a may adjust a beamwidth of a serving beam based on the request. In some cases, step values for beamwidth adjustments may be defined (e.g., a step value of 5 degrees) and the UE 115-a and base station 105-a may use an iterative process based on step increases/decreases in beamwidth for each iteration until a beam solution converges. Such techniques may allow for efficient wireless resource utilization through efficient selection and maintenance of beams between the UE 115-a and base station 105-a. Further, such techniques may allow for more reliable and lower latency communications through use of beams having enhanced channel conditions.

Figure 3:
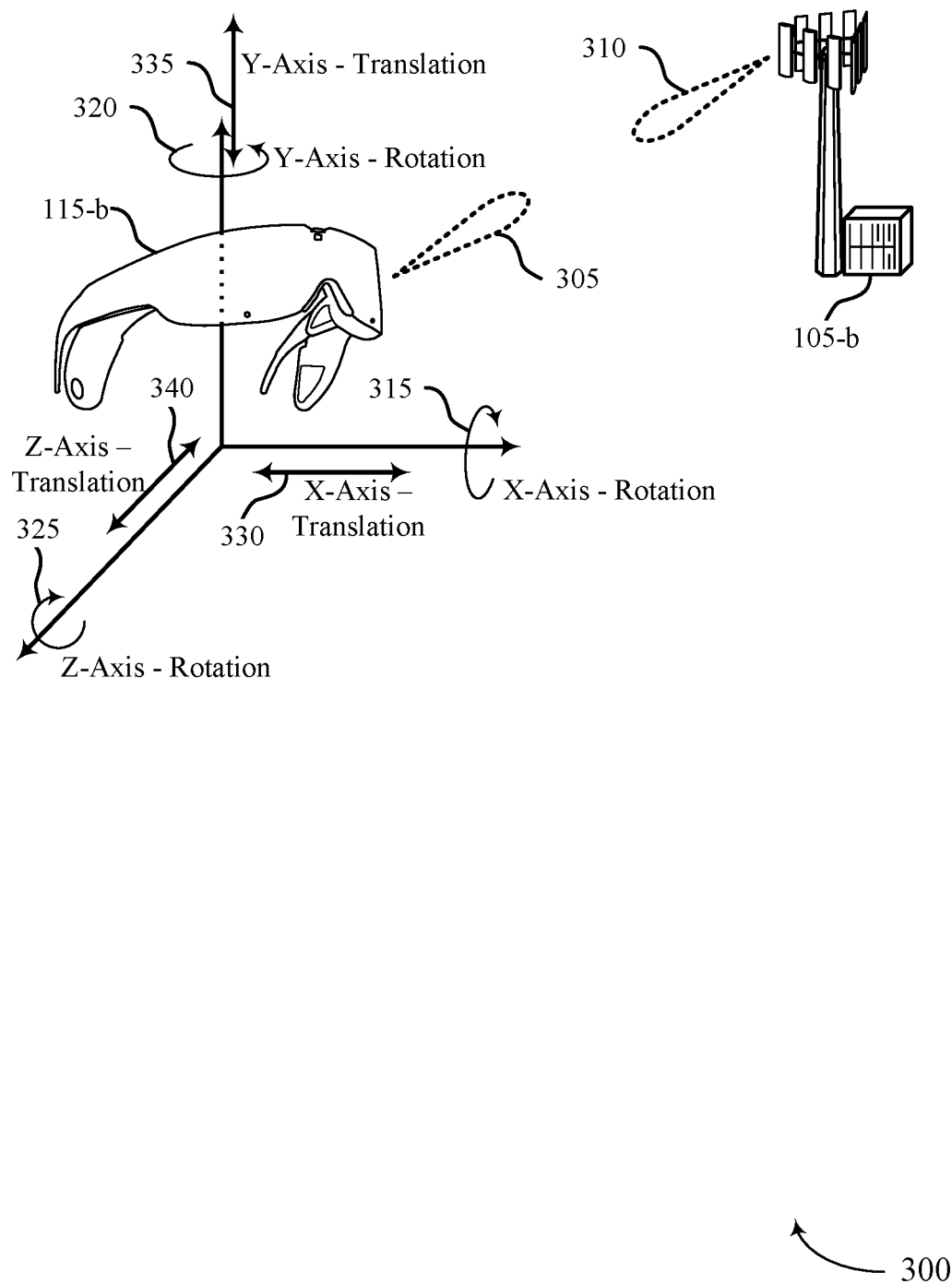
FIG. 3 illustrates an example of UE pose parameters that support pose-based beamforming techniques for wireless communications in accordance with aspects of the present disclosure.

FIG. 3 illustrates an example of UE pose parameters 300 that support pose-based beamforming techniques for wireless communications in accordance with aspects of the present disclosure. In some examples, UE pose parameters 300 may be utilized in aspects of wireless communications systems 100 or 200 to request beams or beam updates. For example, a UE 115-b and base station 105-b may establish communications using a UE beam 305 and a base station beam 310. The UE 115-b may run an XR application at an application layer, which may provide pose information (e.g., 6DOF pose information) to lower layers at the UE 115-b for use in beam management and configuration.

In this example, the UE 115-b may be an untethered XR headset (e.g., XR goggles or glasses) that includes components for wireless communications with base station 105-b, such as antennas (e.g., FR1 antennas and mmW antennas), transmit/receive components, and associated processing components. The XR application at the UE 115-b may measure movement in six degrees freedom (6DOF), which may include X-axis rotation 315, Y-axis rotation 320, Z-axis rotation 335, X-axis translation 330, Y-axis translation 335, and Z-axis translation 340. In cases that measure 6DOF, a user may be able to move about a virtual scene and see views from different perspectives (e.g., look around corners), and in other cases movements may be measured in three degrees of freedom (3DOF) that may allow a user to look around a scene from a fixed point (e.g., rotational movement only). In some cases, the XR application may measure a rate of change of the measurements, may determine predicted poses for one or more future time period, or any combinations thereof. As discussed, UE 115-b movements may result in the UE beam 305, the base station beam 310, or both, experiencing variable or degrading channel conditions, and in various aspects the pose information may be used to generate a beam request that is transmitted to the base station 105-b to update or change the base station beam 310. In some cases, the UE 115-b may adjust its own UE beam 305 directly based on pose information and other information available to the UE 115-b (e.g., physical layer measurements related to channel condition, etc.) that may be used to determine UE position information and perform beam adjustments. In some cases, pose parameters provided by the XR application may include one or more of orientation information relative to a reference orientation, rotational movement information relative to one or more axes of rotation, translational movement information relative to one or more axes of translation, distance information relative to one or more reference points, or any combinations thereof, that the UE 115-b may use to determine UE position.

In some cases, the UE 115-b may include one or multiple sensors, cameras, or other components that provide information to the XR application for determination of pose information. For example, an XR headset such as UE 115-b may provide for tracking of a user's head movement to derive actual and predictive head poses, using information from, for example, a camera and sensors such as gyroscope and accelerometer. The gyroscope may provide orientation information (e.g., rotation around an axis and angular velocity) for one or multiple axes, and the accelerometer may provide vibration or a rate of change of velocity for one or multiple axes. In some cases, the XR application may provide predictive head poses (e.g., predictions for 25 ms ahead, or 100 ms ahead) that may be based on measured metrics and historical movements related to the metrics, an application running at the XR application (e.g., a gaming application in which a certain set of movements are expected), a round trip time (e.g., an amount of time to update a scene that is likely to trigger a certain movement), or any combinations thereof. In some cases, AI or machine learning algorithms may be used to generate predictive poses based on historical user movements, one or more sets or training data, or any combinations thereof. In cases where the UE 115-b uses beamformed communications, as discussed herein, UE 115-b movements may result in the base station beam 310 and UE beam 305 becoming misaligned, which may impact channel quality and reduce supportable data rates and, in some cases, may result in a beam failure that triggers a new beam training procedure. UE 115-b use of the pose information to generate one or more beam requests for an updated beam or beam switch may thus enhance performance and user experience. Examples of pose-based beams are discussed with reference to FIGS. 4 and 5.

Figure 4:
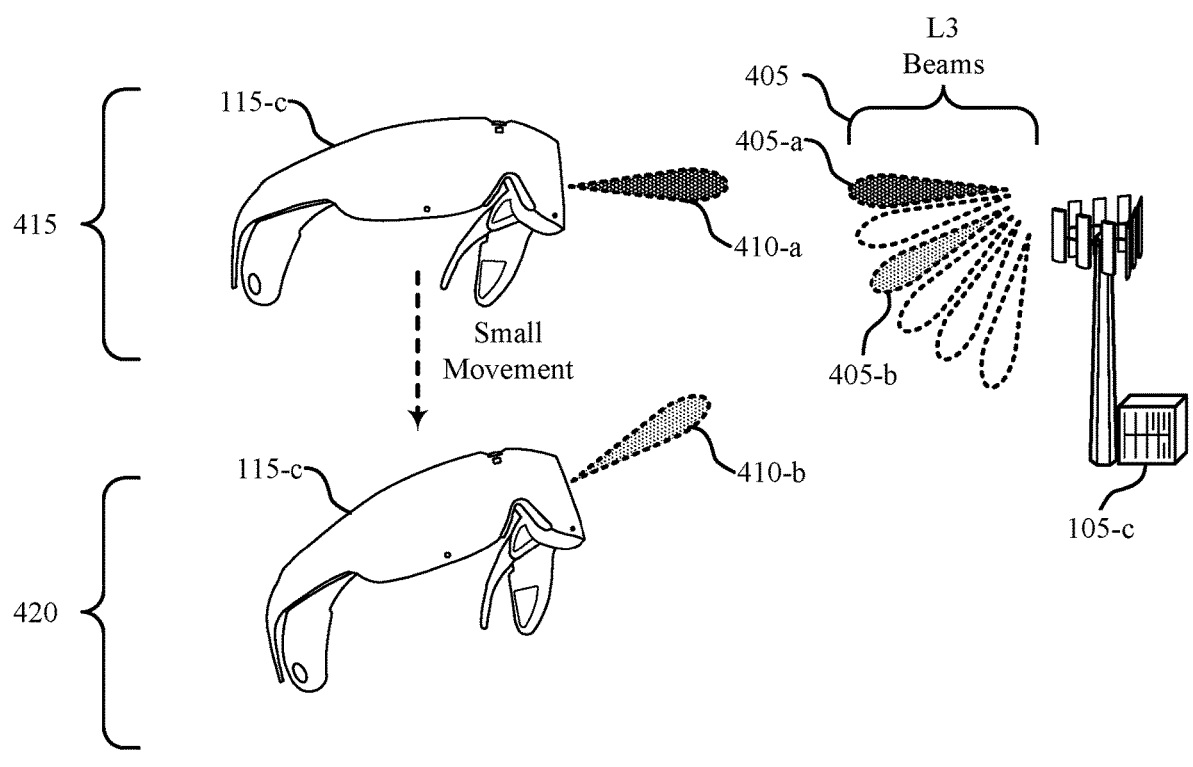
FIGS. 4 and 5 illustrate examples of pose-based beams and pose-based beamforming techniques for wireless communications in accordance with aspects of the present disclosure.

FIG. 4 illustrates an example of pose-based beams 400 that support pose-based beamforming techniques for wireless communications in accordance with aspects of the present disclosure. In this example, a UE 115-c and a base station 105-c (which may be examples of UEs and base stations as discussed herein) may communicate periodic traffic associated with an XR application.

In this example, the UE 115-c may experience relatively small movements (e.g., based on a restricted available range of movements) having a relatively low mobility, such that L3 beams 405 may be used for communications. In this example, the UE 115-c may move from a first position 415 that uses first UE beam 410-a and first L3 beam 405-a at the base station 105-c to a second position 420 that uses second UE beam 410-b and second L3 beam 405-b. Using relatively narrow L3 beams may allow for higher beamforming gain at a lower total power, which may enhance communications throughput and reliability, reduce power consumption, and may also allow the base station 105-c to serve a larger number UEs concurrently. In other cases, due to a magnitude and speed of movement, an L1 beam may be better suited for communications, such as illustrated in FIG. 5.

Figure 5:
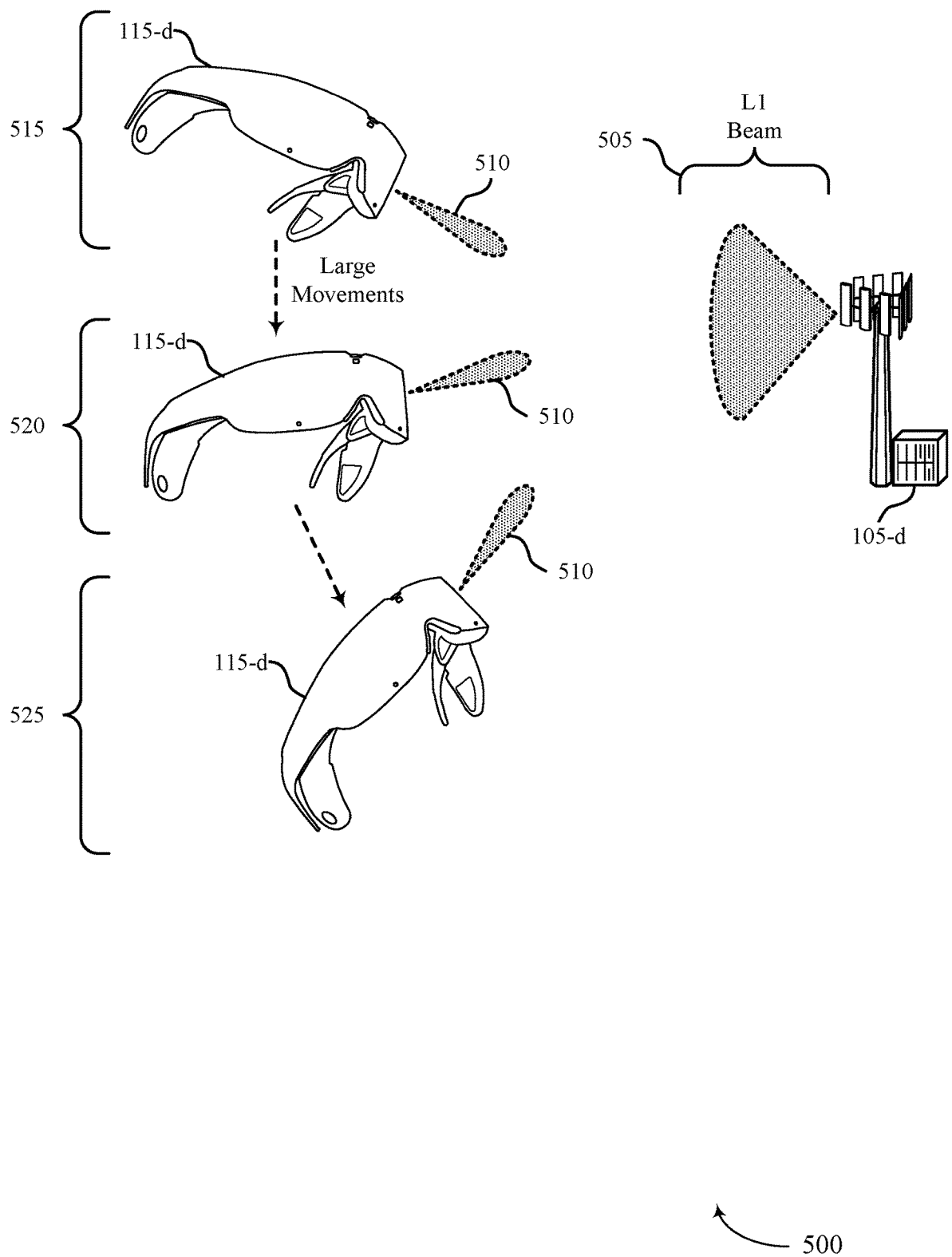

FIG. 5 illustrates an example of a pose-based beams 500 that supports pose-based beamforming techniques for wireless communications in accordance with aspects of the present disclosure. In this example, a UE 115-d and a base station 105-d (which may be examples of UEs and base stations as discussed herein) may communicate periodic traffic associated with an XR application.

In this example, the UE 115-d may experience relatively large movements (e.g., based on an unrestricted available range of movements of the XR application) having a relatively high mobility and rate of change, such that L1 beam 505 may be better suited for communications than L3 beams. In this example, the UE 115-d may move from a first position 515, to a second position 520, and then to a third position 525, in relatively short order, and the L1 beam 505 at the base station 105-d may be suited for communications with UE beam 510, which may also be an L1 beam. Using relatively wide L1 beams in such cases may result in lower beamforming gain but allow for broader uninterrupted coverage in such use cases, which may enhance communications reliability and reduce a number of retransmissions.

In some cases, the UE 115-d may dynamically determine to switch between L3 beams, or switch between L1 and L3 beams, based on pose information provided by the XR application, historical pose information, a rate of change of parameters in the pose information, predictive pose information, or any combinations thereof. For example, if the positioning information derived from the XR application pose information shows an increasing distance between the UE 115-d and base station 105-d, L3 beams may be better suited for communications due to the associated beamforming gain, and if the distance is decreasing the broader L1 beam 505 may be used. In further cases, a same beam (e.g., a beam having a same transmission configuration indicator (TCI) state) may be used but the UE 115-d may request a beamwidth change (e.g., to change a beamwidth by a step value such as plus 5 degrees or minus 5 degrees, or request a particular beamwidth such as 15 degrees). Such beam switch requests, or beamwidth change requests, may reduce the probability of misaligned UE 115-d and base station 105-d beams.

Figure 6:
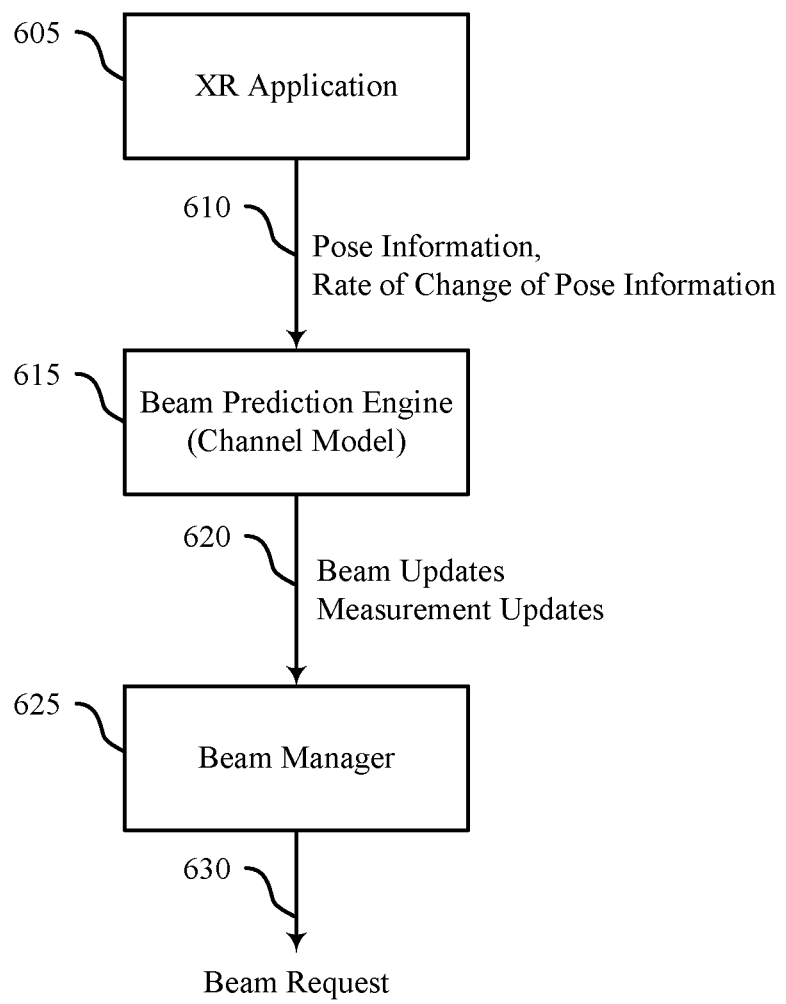
FIG. 6 illustrates an example of a beam request flow that supports pose-based beamforming techniques for wireless communications in accordance with aspects of the present disclosure.

FIG. 6 illustrates an example of a beam request flow 600 that supports pose-based beamforming techniques for wireless communications in accordance with aspects of the present disclosure. In some examples, beam request flow 600 may be utilized in aspects of wireless communications systems 100 or 200 to request beams or beam updates.

In this example, an XR application 605 may run at an application layer of a UE. The XR application 605 may be any of a number of XR applications that may be supported at the UE, such as a VR application, an AR application, or an MR application, that renders scenes or other content at a user interface based on user position, one or more user inputs, or any combinations thereof. The XR application 605 may provide pose information 610, which may include a rate of change of pose information, to a beam prediction engine 615. For example, pose information 610 may include 6DOF pose information and rates of change thereof. The beam prediction engine 615 may run at a lower layer of the UE than the application layer, such as at a RLC layer, MAC layer, RRC layer, or physical layer, or combinations thereof. In some cases, the beam prediction engine 615 may receive the pose information 610, and determine beam updates or measurement updates 620. The beam updates or measurement updates 620 may be provided to a beam manager 625, that may provide a beam request 630 to the base station.

The beam prediction engine 615 may determine, for example, that the UE is to move from an L1 beam to an L3 beam based on a distance between the UE and base station and a rate of change of one or more pose parameters. In other examples, the beam prediction engine 615 may determine that the UE is to move between different L3 beams, that the UE is to move from an L3 beam to an L1 beam, that a beamwidth of a beam should be adjusted, or combinations thereof. In some cases, the beam prediction engine 615 may use a channel model to determine beam information that is associated with the pose information 610. For example, the channel model may be a machine learning model based on historical beam measurements and pose information. In some cases, the channel model at the beam prediction engine 615 may be trained based on an initial training data set and machine learning algorithm, and updated based on actual beams, pose information, and associated beam measurements that are collected and stored at the UE through use. In some cases, the channel model may be based on a lookup table that is indexed based on the pose information, rate of change of the pose information, and the expected output. In some cases, the UE may be configured by a base station to use the beam prediction engine 615 and to use a particular channel model (e.g., based on an XR application, channel conditions at the UE, and the like).

In some cases, various ranges of 6DOF positioning and orientation information may be provided to the channel model and the output may be L1 or L3 updates, a change in beamwidth for a beam, or combinations thereof. In some cases, the channel model may be developed based on codebook and antenna configuration sharing, in which the base station may share its codebook (e.g., via RRC signaling, DCI, or a MAC-CE) which has beam layout, beam width, and orientation information, with the UE. Based on the base station codebook the channel model may identify a preferred beam based on the pose information 610 provided by the XR application 605. In other cases, the UE may perform antenna mapping using angle of arrival estimation, and the channel model may be trained based on received pose information 610 (and/or rate of change thereof) and corresponding observed metrics such as the uplink reference signal received power (RSRP) or error rate. The channel model output may indicate a change to L1 or L3 beam, or a change to beamwidth, that the beam manager 625 may use to transmit beam request 630 to the base station for a change or adjustment to the base station beam. In some cases that use the measurement-based approach, the UE may accumulate data points based on its movement and measurement history. For example, the UE may record its movement, its own beams and measurements from the base station (e.g. RSRP measurements) for L1 or L3 beams or a given beam with varying beamwidth. The UE may then use this history to determine a mapping between UE movement (e.g., rotational/translational movement based on 6DOF pose information), UE beam and base station use of L1/L3 or that same beam with varying beam width. In some cases, when requesting a change for beamwidth, the UE and base station may follow an iterative process such as discussed in more detail with reference to FIG. 8. It is to be noted that various examples discussed herein are with reference to a base station, and it is to be understood that such a base station may include one or more transmission reception points (TRPs), and the described model may be for one or multiple TRPs.

Figure 7:
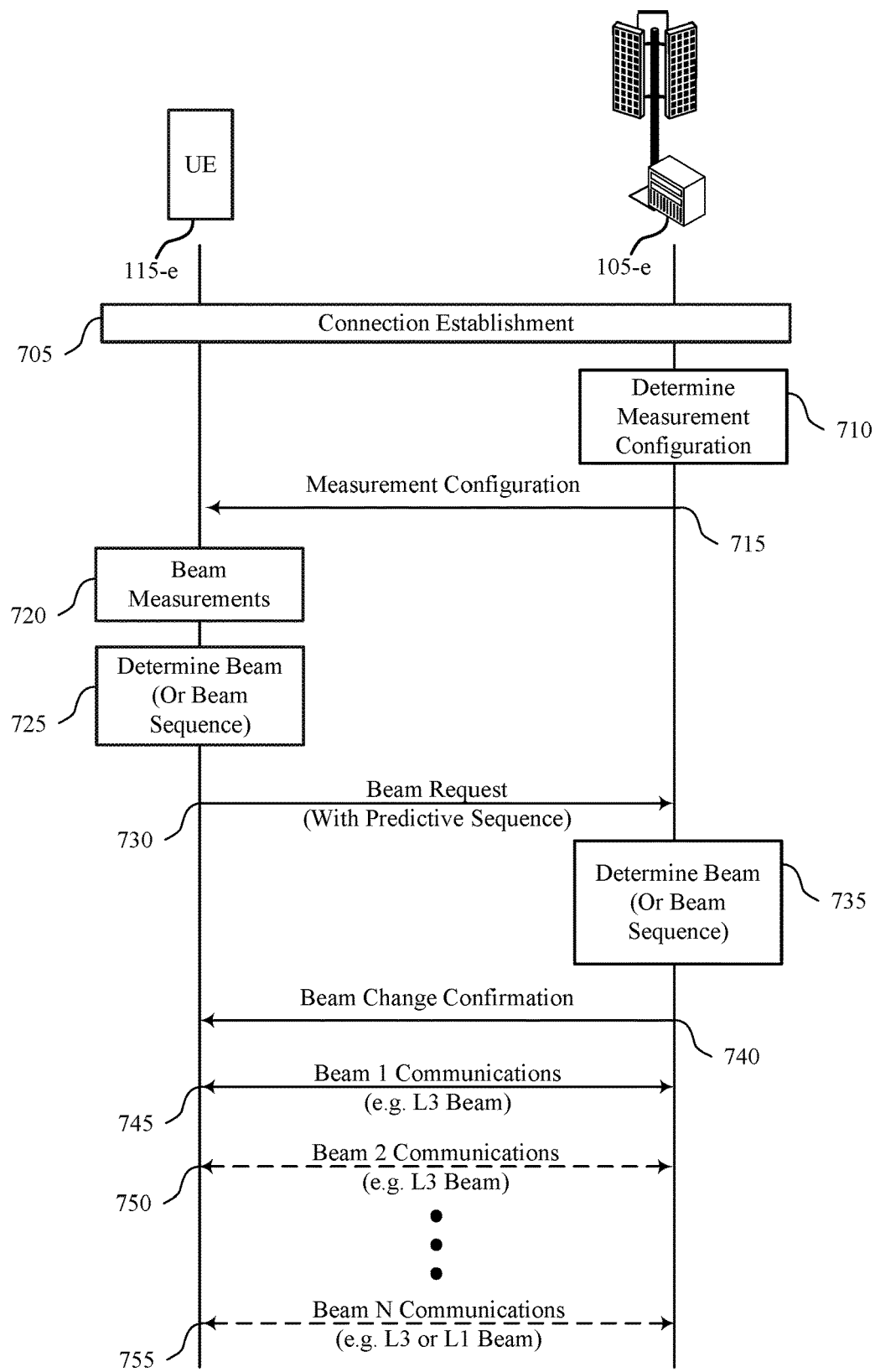
FIGS. 7 and 8 illustrate examples of process flows that support pose-based beamforming techniques for wireless communications in accordance with aspects of the present disclosure.

FIG. 7 illustrates an example of a process flow 700 that supports pose-based beamforming techniques for wireless communications in accordance with aspects of the present disclosure. In some examples, process flow 700 may implement aspects of techniques as discussed with reference to FIGS. 1 through 6. The process flow 700 may be based on a configuration by a base station 105-e for beam requests by a UE 115-e to promote beam alignment in cases where UE 115-e movement is likely, and to promote efficient resource usage through efficient and reliable beamformed communications (e.g., for XR-based applications). The process flow 700 may be implemented to promote high reliability and low latency communications (e.g., transmission of position information and control information of the UE 115-e for an XR application), among other benefits.

In the following description of the process flow 700, the operations between the base station 105-e and the UE 115-e may be transmitted in a different order than the example order shown, or the operations performed by the base station 105-e and the UE 115-e may be performed in different orders or at different times. Some operations may also be omitted from the process flow 700, and other operations may be added to the process flow 700. The base station 105-e and the UE 115-e may be examples of a base station 105 and a UE 115 as described herein.

At 705, the base station 105-e and the UE 115-e may establish a connection for wireless communications. In some cases, the connection may be established using RRC protocols for an RRC connection establishment, and an initial beam pair may be configured for uplink and downlink communications. In some cases, the connection may be established as part on an initiation of an XR session. In some cases, the XR session may be initiated based on the UE 115-b entering into communications to exchange XR traffic with an XR server via communications through the base station 105-e.

At 710, the base station 105-e may determine a measurement configuration for the UE 115-e. In some cases, as part of the connection establishment, the base station 105-e may determine that the UE 115-e has a capability to perform beam update requests that are based on pose information from an XR application, and that the connection is to exchange XR traffic. The measurement configuration may indicate that the UE 115-e is to perform beam measurements and use pose information to determine preferred beam or beam adjustment. At 715, the base station 105-e may transmit, and the UE 115-e may receive, the measurement configuration.

In some cases, the base station 105-e may preconfigure the UE 115-e with multiple SSB L1 beams, and the UE 115-e may identify reference signals for measurement (e.g., channel state information reference signals (CSI-RSs)) that are preconfigured for multiple L3 beams. In some cases, the base station 105-e may indicate L3 beams and L1 beams during pre-configuration using specific reference signals with a measurement configuration. Further, the UE 115-e may also be pre-configured with reporting resources associated with the measurements.

In some cases, the measurement configuration may include information for dynamic switching of L1 or L3 beams. For example, the configuration may include a measurement object N, a flag indicating L1/L3 beam and/or beamwidth for each SSB or CSI-RS indicated by the base station.

At 720, the UE 115-e may perform one or more beam measurements. In some cases, the UE 115-e may be triggered to perform measurements based on actual and/or predictive pose information, and the UE 115-e may start measuring and reporting one or more L1 or L3 beams. At 725, the UE 115-e may determine a beam, or beam sequence, based on the measuring. In some cases, the beams (e.g., L1 beams, L3 beams, or combinations thereof) may be listed in order or descending RSRP, and an index of the specific beam and associated reference signal may be signaled to the base station 105-e in a beam request, as indicated at 730. In some cases, pose information from the XR application at the UE 115-e may be stored along with measurement information, for future use in a channel model to determine a preferred beam or beam adjustment.

In some cases, lower layers at the UE 115-e may receive pose information from the XR application, and may extract relative or actual positioning, orientation and rate of change of this information from the pose information, and the information to determine updates to the beamwidth or to switch beams (e.g., to switch between L1 and L3 beam, or to/from L1 and L3 beams). The determination of the beam may be based on a channel model and the pose information. In some cases, predictive UE 115-e position information may be determined for one or more future time periods based on the pose information, and a sequence of beams may be determined (e.g., a sequence of L3 beams based on expected movement of the UE 115-e when interacting with the XR application).

In some cases, the beam request may be signaled in configured signaling resources, such as in PUCCH resources, PUSCH resources, or a scheduling request (SR). In cases where the signaling is transmitted in PUCCH resources, a PUCCH format may be defined with dedicated signaling with a vector (e.g., a PUCCH format dedicated to such a UE request) that may be configured to be aperiodic or periodic PUCCH. In other cases, the request may be provided in one or more fields that are included with a SR message. In other cases, a PUSCH message may be defined for the request, such as a MAC-CE that is configured to carry the request. In some cases, the beam request may be provided in one or more fields that are added to one or more beam-related messages, such as a beam report that may be configured for aperiodic or periodic transmissions using PUSCH (e.g., using a configured grant).

In some cases, the beam request message may include an indication of one or multiple beams, such as:
1: TCI State 1, time 1, TRP ID1
2: TCI State 2, time 2, TRP ID2
. . .
N: TCI State N, time N, TRP ID N.
Thus, the UE 115-e may provide a list of TCI states corresponding to L1/L3 beam changes and corresponding times (e.g., based on an absolute time, a slot offset, timer values, etc.) when beam should be changed and at which TRP.

At 735, the base station 105-e may determine the base station beam that is to be used for communications with the UE 115-e. In cases where the UE 115-e provides a sequence of beams, the base station 105-d may determine a beam sequence and associated timing for sequencing through the beams. At 740, the base station 105-e may transmit, and the UE 115-e may receive, a beam change confirmation that indicates the beam to be switched to, or sequence of beams and associated timing.

In some cases, the beam change confirmation may be provided in a MAC-CE that indicates TCIs to activate or deactivate. In some cases, the TCI state in a beam sequence to be activated may already be configured (e.g., included in an active TCI state list), and the base station 105-e may activate the beam sequence with timing information by activating TCI state T0, and DCI signaling may be used to activate TCI states as follows:

1: TCI state 1, Time 1, TRP ID1
2: TCI state 2, Time 2, TRP ID2
. . .
N: TCI state N, Time N, TRP IDN At 745, the UE 115-e and base station 105-e may exchange communications using the changed beam. In cases where a sequence of beams is provided based on predictive position information, the communications may use a first beam of the sequence of beams (e.g., a first L3 beam). In cases where the sequence of beams is provided, at 750 the UE 115-e and base station 105-e may exchange communications using a second beam (e.g., an L3 beam, and so on until, at 755, communications may use an Nth beam of the sequence (e.g., an L1 beam or L3 beam).

Figure 8:
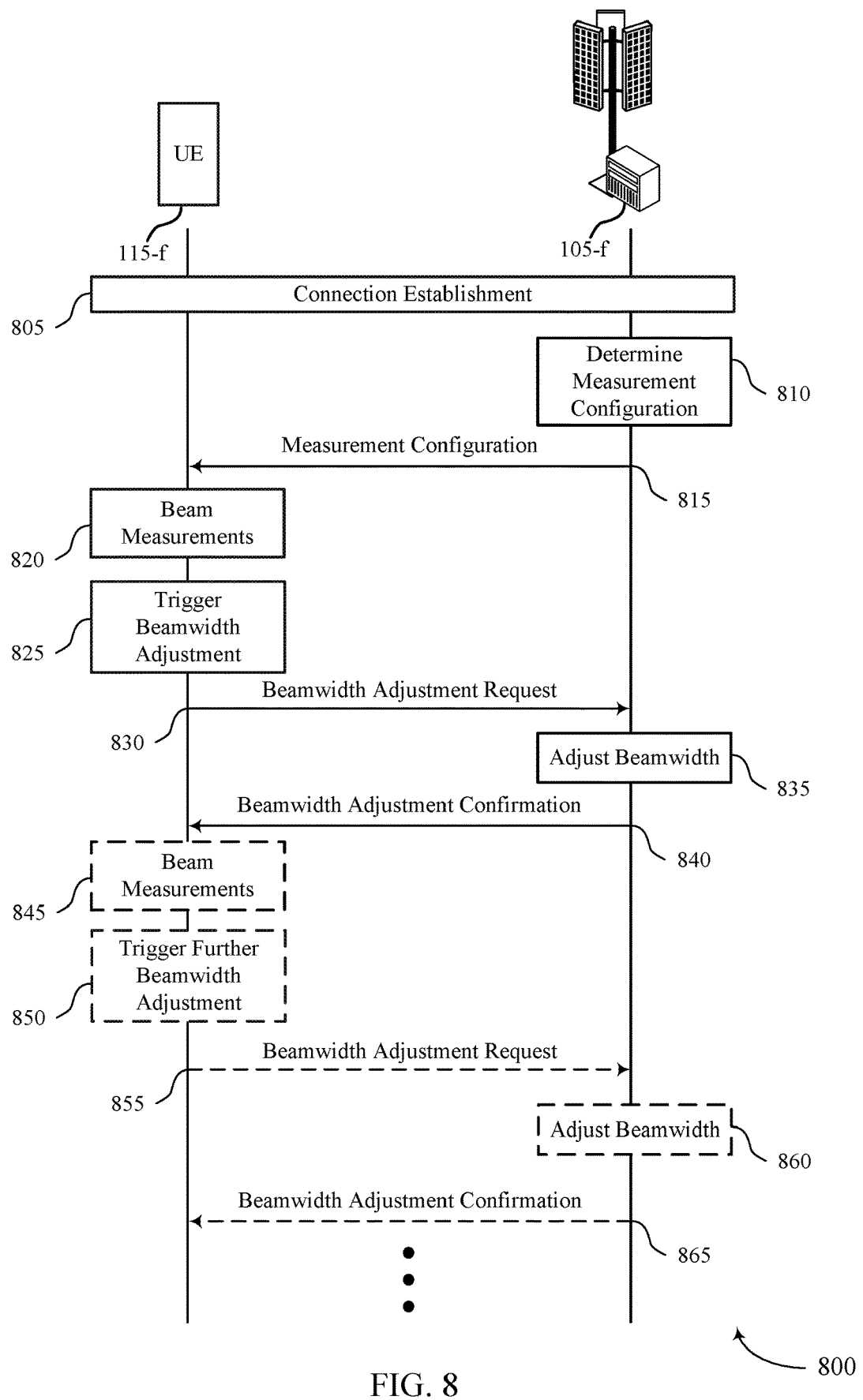

FIG. 8 illustrates an example of a process flow 800 that supports pose-based beamforming techniques for wireless communications in accordance with aspects of the present disclosure. In some examples, process flow 800 may implement aspects of techniques as discussed with reference to FIGS. 1 through 6. The process flow 800 may be based on a configuration by a base station 105-f for beam requests by a UE 115-f to promote beam alignment in cases where UE 115-f movement is likely, and to promote efficient resource usage through efficient and reliable beamformed communications (e.g., for XR-based applications). The process flow 800 may be implemented to promote high reliability and low latency communications (e.g., transmission of position information and control information of the UE 115-f for an XR application), among other benefits.

In the following description of the process flow 800, the operations between the base station 105-f and the UE 115-f may be transmitted in a different order than the example order shown, or the operations performed by the base station 105-f and the UE 115-f may be performed in different orders or at different times. Some operations may also be omitted from the process flow 800, and other operations may be added to the process flow 800. The base station 105-f and the UE 115-f may be examples of a base station 105 and a UE 115 as described herein.

At 805, the base station 105-f and the UE 115-f may establish a connection for wireless communications. In some cases, the connection may be established using RRC protocols for an RRC connection establishment, and an initial beam pair may be configured for uplink and downlink communications. In some cases, the connection may be established as part on an initiation of an XR session. In some cases, the XR session may be initiated based on the UE 115-b entering into communications to exchange XR traffic with an XR server via communications through the base station 105-f.

At 810, the base station 105-f may determine a measurement configuration for the UE 115-f. In some cases, as part of the connection establishment, the base station 105-f may determine that the UE 115-f has a capability to perform beam update requests that are based on pose information from an XR application, and that the connection is to exchange XR traffic. The measurement configuration may indicate that the UE 115-f is to perform beam measurements and use pose information to determine preferred beam or beamwidth adjustment. At 815, the base station 105-f may transmit, and the UE 115-f may receive, the measurement configuration. In some cases, the measurement configuration may include information for beamwidth measurements of L1 or L3 beams. For example, the configuration may include a measurement object N, and a beamwidth for each SSB or CSI-RS indicated by the base station.

In some cases, the measurement configuration may include an initial beamwidth (e.g., for SSB or CSI-RS). In some cases, the base station 105-f may specify a beamwidth range of valid beamwidths for L1 or L3 beams. In some cases, the range of the beamwidths may be pre-configured and signaled using RRC or MAC signaling. Further, in some cases, a beamwidth step size may be configured (or may be pre-configured by the base station 105-f). The configuration may also indicate an available direction of beamwidth change, such as azimuth, elevation, or both, and whether bandwidth may be increased, decreased, or maintained. Further, in some cases, an optional TRP ID may be included with the configuration information, and if more than one TRP is used for communications separate configurations for each may be provided.

At 820, the UE 115-f may perform one or more beam measurements. In some cases, the UE 115-f may be triggered to perform measurements based on actual and/or predictive pose information, and the UE 115-f may start measuring and reporting one or more L1 or L3 beams. At 825, the UE 115-f may determine a beamwidth adjustment trigger, based on the measuring. In some cases, lower layers at the UE 115-f may receive pose information from the XR application, and may extract relative or actual positioning, orientation and rate of change of this information from the pose information, and the information to determine updates to the beamwidth. The determination of the beamwidth may be based on a channel model and the pose information. In some cases, predictive UE 115-f position information may be determined for one or more future time periods based on the pose information, and a sequence of beamwidths may be determined based on expected movement of the UE 115-f.

In some cases, the beamwidth adjustment request may be signaled in configured signaling resources, such as in PUCCH resources, PUSCH resources, or a scheduling request (SR). In cases where the signaling is transmitted in PUCCH resources, a PUCCH format may be defined with dedicated signaling with a vector (e.g., a PUCCH format dedicated to such a UE request) that may be configured to be aperiodic or periodic PUCCH. In other cases, the request may be provided in one or more fields that are included with a SR message. In other cases, a PUSCH message may be defined for the request, such as a MAC-CE that is configured to carry the request. In some cases, the beamwidth adjustment request may be provided in one or more fields that are added to one or more beam-related messages, such as a beam report that may be configured for aperiodic or periodic transmissions using PUSCH (e.g., using a configured grant).

In some cases, the beamwidth adjustment request message may include an indication of one or multiple requested adjustments, such as:

1: TCI State X, beamwidth value 1, beamwidth direction 1, time 1, TRP ID1
2: TCI State X, beamwidth value 2, beamwidth direction 2, time 2, TRP ID2
. . .
N: TCI State X, beamwidth value N, beamwidth direction N, timeN2, TRP IDN.

Thus, the UE 115-f may provide a list beamwidth information corresponding to requested beamwidth adjustments and corresponding times (e.g., based on an absolute time, a slot offset, timer values, etc.) when beamwidth should be changed and at which TRP. In some cases, the UE 115-f may signal that the beamwidth direction is to be applied in the azimuth, elevation, or both. In some cases, beamwidth values may be chosen at a pre-configured range, or may be indicated as factor of the pre-configured step size (e.g., Y*step size, where Y is a positive or negative number or integer.

At 835, the base station 105-*f* may adjust the beamwidth of the beam that is to be used for communications with the UE 115-*f* In cases where the UE 115-*f* provides a sequence of beamwidths, the base station 105-*d* may determine a beamwidth sequence and associated timing for sequencing through the beamwidths. At 840, the base station 105-*f* may transmit, and the UE 115-*f* may receive, a beam change confirmation that indicates the beamwidth change, or sequence of beamwidths and associated timing.

In some cases, the beamwidth change confirmation may be provided in a MAC-CE or DCI that indicates a beam TCI and may activate a beamwidth sequence with timing information, such as follows:

1: TCI state X, Beamwidth value 1, Beamwidth direction 1, Time 1, TRP ID1

2: TCI state X, Beamwidth value 2, Beamwidth direction 2, Time 2, TRP ID2

. . .

N: TCI state X, Beamwidth value N, Beamwidth direction N, Time N, TRP IDN

In some cases, a closed loop beamwidth adjustment procedure may be used to determine a beamwidth for communications. In such cases, the beamwidth adjustment request at 830 may include an indication to initiate the closed loop procedure, such as:

1: TCI State X, beamwidth value 1, beamwidth direction 1, TRP ID1

2: TCI State X, increase/decrease/hold request, beamwidth direction 1, TRP ID1.

Thus, the UE 115-*f* may provide beamwidth adjustment information corresponding to the requested beamwidth adjustment and at which TRP. In some cases, the UE 115-*f* may signal that the beamwidth direction is to be applied in the azimuth, elevation, or both. In some cases, beamwidth adjustments may be made at a pre-configured step size (e.g., +/−5 degree changes). In such cases, an increase or decrease requests a change in steps of the preconfigure step size, and hold requests the beamwidth should be held steady (e.g., in elevation or azimuth). Further, in closed loop adjustment cases, the base station 105-*f* may transmit the beamwidth adjustment confirmation at 840 as follows:

1: TCI State X, Beamwidth value 1, Beamwidth direction 1, TRP ID1

2: TCI State X, increase/decrease/hold command, Beamwidth direction 1, TRP ID1.

In closed-loop adjustment cases, at 845, the UE 115-*f* may perform beam measurements on the adjusted beamwidth beam. At 850, the UE 115-*f* may determine whether to trigger a further beamwidth adjustment, based on the measuring, in a similar manner as discussed above. At 855, the UE 115-*f* may transmit a further beamwidth adjustment request, including information as discussed above. The base station 105-*f* may again, at 860, adjust the beamwidth and transmit, at 865, a confirmation of beamwidth change. The UE 115-*f* may take measurements on the revised beam for a period and, based on the measurements, one or more further beamwidth changes may be requested and measured. For example, if a performance measurement (e.g. RSRP or error rate) indicates sub-optimal performance or a power measurement indicates too much power drain, the UE 115-*f* may then request a further increase or decrease in beamwidth (e.g., according to the preconfigured step size). The UE 115-*f* and base station 105-*f* may iterate until further beamwidth changes are not necessary (e.g., convergence is reached).

Figure 9:
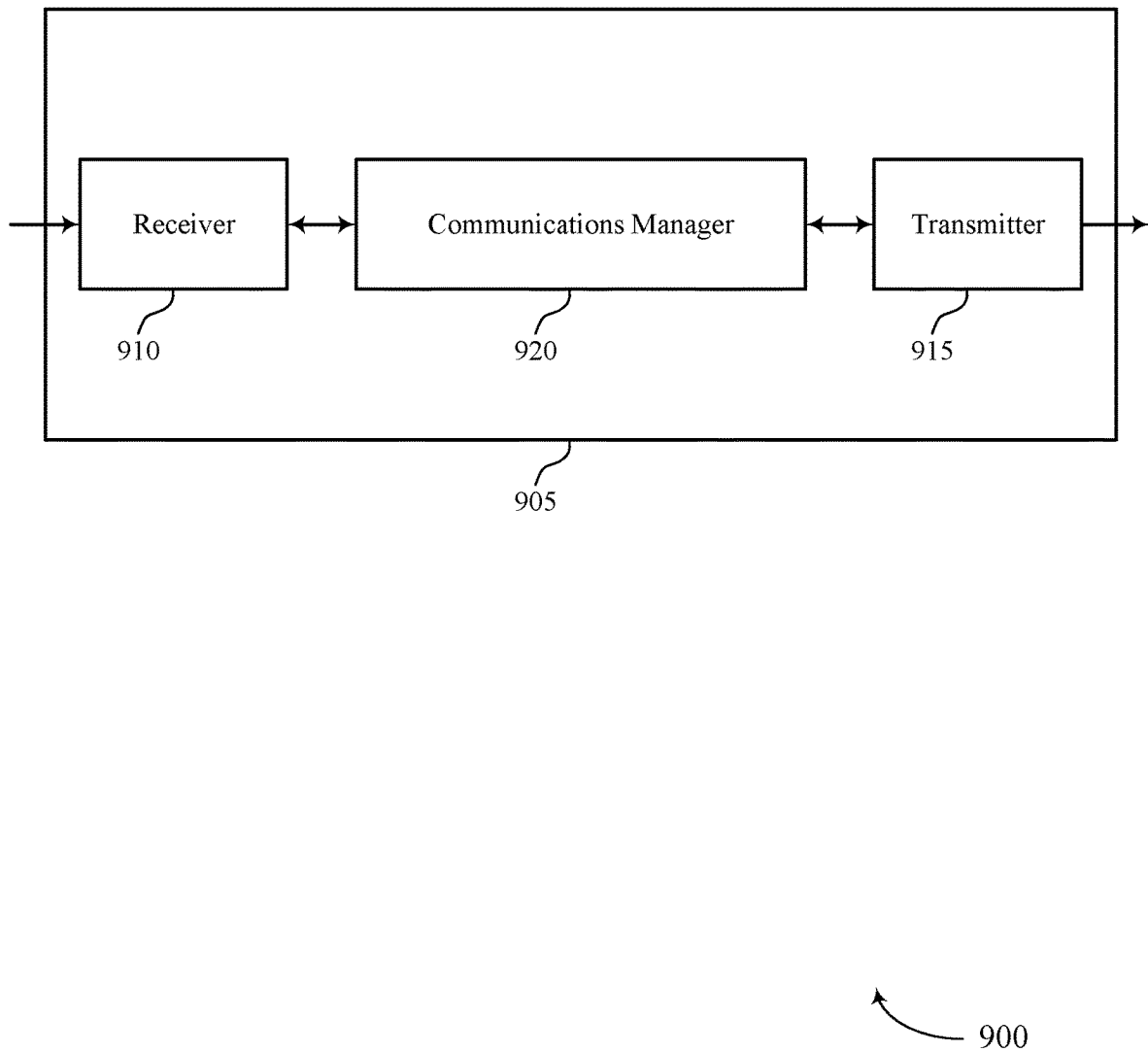
FIGS. 9 and 10 show block diagrams of devices that support pose-based beamforming techniques for wireless communications in accordance with aspects of the present disclosure.

FIG. 9 shows a block diagram 900 of a device 905 that supports pose-based beamforming techniques for wireless communications in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to pose-based beamforming techniques for wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to pose-based beamforming techniques for wireless communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of pose-based beamforming techniques for wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for transmitting, to a base station, a beam request for a first beam having one or more requested beam parameters for beamformed communications between the base station and the UE, the requested beam parameters based on user position information associated with an extended reality application at the UE. The communications manager 920 may be configured as or otherwise support a means for receiving, from the base station, a first beam configuration responsive to the beam request. The communications manager 920 may be configured as or otherwise support a means for communicating with the base station using the first beam configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for pose-based beam adjustments that provide enhanced reliability and lower latency for XR-related operations, and enhanced user experience.

Figure 10:
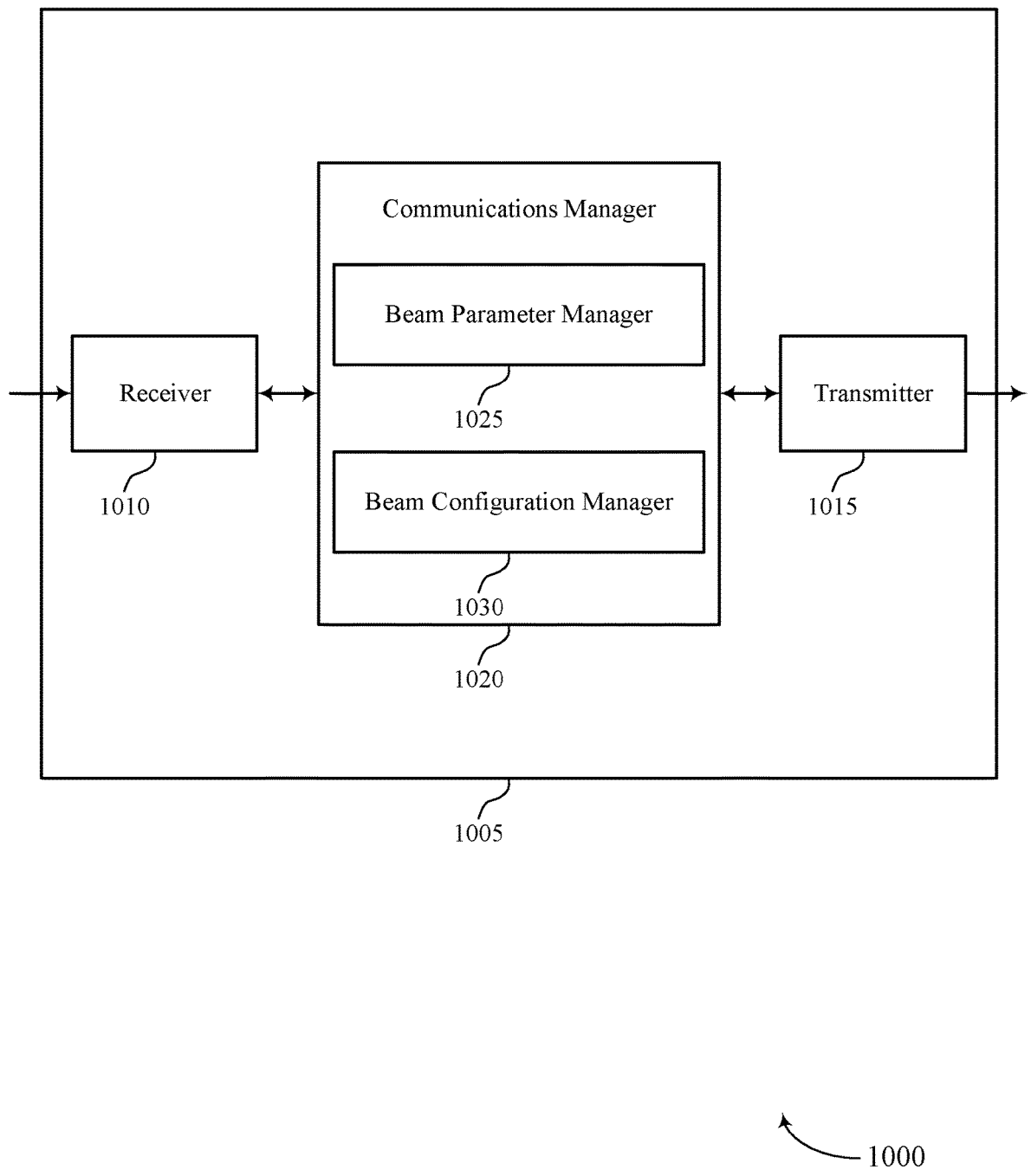

FIG. 10 shows a block diagram 1000 of a device 1005 that supports pose-based beamforming techniques for wireless communications in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to pose-based beamforming techniques for wireless communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to pose-based beamforming techniques for wireless communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of pose-based beamforming techniques for wireless communications as described herein. For example, the communications manager 1020 may include a beam parameter manager 1025 a beam configuration manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The beam parameter manager 1025 may be configured as or otherwise support a means for transmitting, to a base station, a beam request for a first beam having one or more requested beam parameters for beamformed communications between the base station and the UE, the requested beam parameters based on user position information associated with an extended reality application at the UE. The beam configuration manager 1030 may be configured as or otherwise support a means for receiving, from the base station, a first beam configuration responsive to the beam request. The beam configuration manager 1030 may be configured as or otherwise support a means for communicating with the base station using the first beam configuration.

Figure 11:
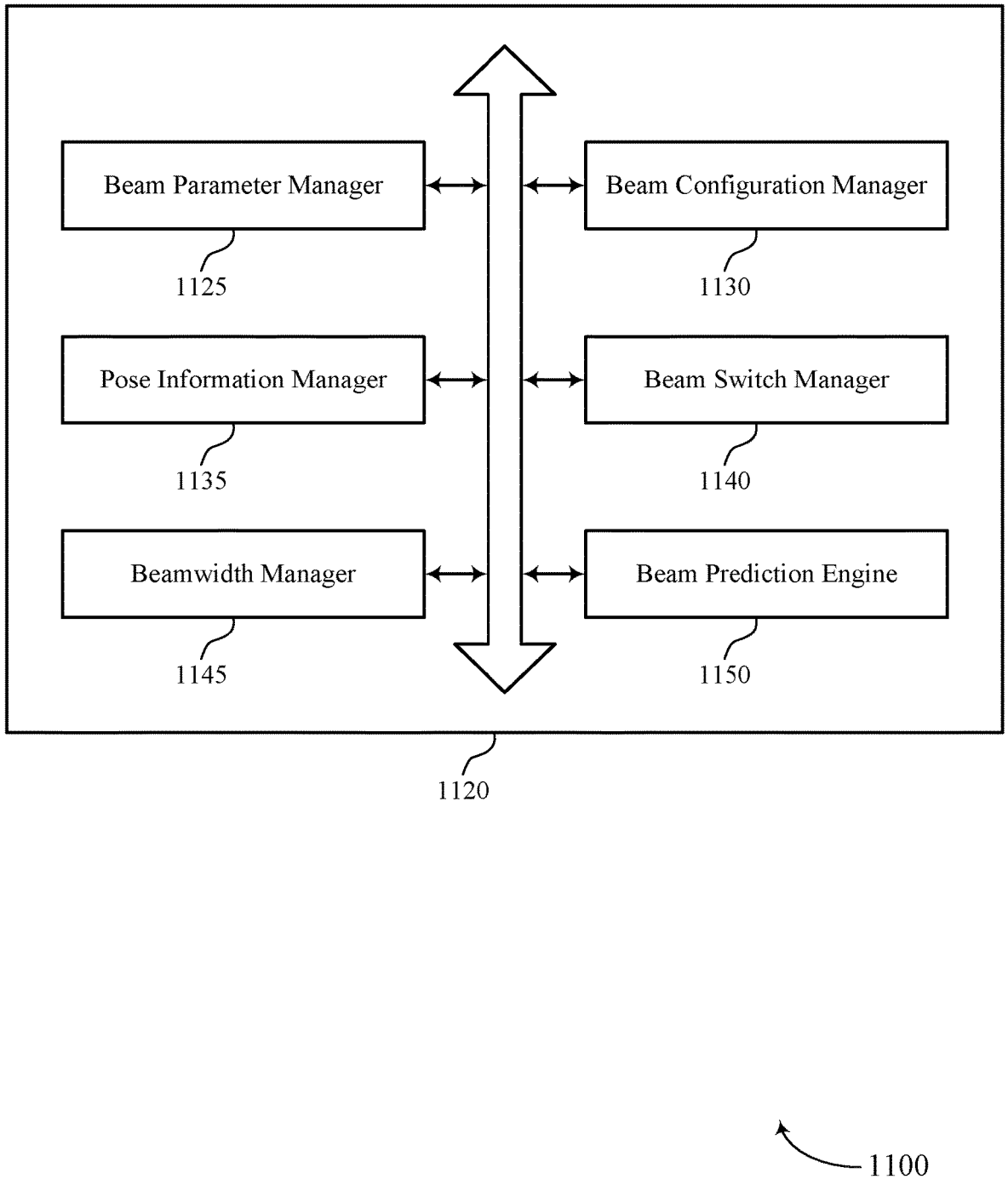
FIG. 11 shows a block diagram of a communications manager that supports pose-based beamforming techniques for wireless communications in accordance with aspects of the present disclosure.

FIG. 11 shows a block diagram 1100 of a communications manager 1120 that supports pose-based beamforming techniques for wireless communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of pose-based beamforming techniques for wireless communications as described herein. For example, the communications manager 1120 may include a beam parameter manager 1125, a beam configuration manager 1130, a pose information manager 1135, a beam switch manager 1140, a beamwidth manager 1145, a beam prediction engine 1150, or any combination thereof. Each of these components may communicate, directly or indirectly, with one another (e.g., via one or more buses).

The communications manager 1120 may support wireless communications at a UE in accordance with examples as disclosed herein. The beam parameter manager 1125 may be configured as or otherwise support a means for transmitting, to a base station, a beam request for a first beam having one or more requested beam parameters for beamformed communications between the base station and the UE, the requested beam parameters based on user position information associated with an extended reality application at the UE. The beam configuration manager 1130 may be configured as or otherwise support a means for receiving, from the base station, a first beam configuration responsive to the beam request. In some examples, the beam configuration manager 1130 may be configured as or otherwise support a means for communicating with the base station using the first beam configuration.

In some examples, the user position information includes pose parameters provided by the extended reality application that include one or more of orientation information of the UE relative to a reference orientation, rotational movement information of the UE relative to one or more axes of rotation, translational movement information relative to one or more axes of translation, or any combinations thereof. In some examples, the pose parameters include one or more current pose parameters for a current time period, one or more predictive pose parameters for one or more future time periods, or any combinations thereof.

In some examples, to support transmitting the beam request, the beam switch manager 1140 may be configured as or otherwise support a means for transmitting a switch request to switch from an existing beam to the first beam, where the existing beam and the first beam are included in a set of multiple configured base station beams that include one or more layer one beams, one or more layer three beams, or any combinations thereof, and where the one or more layer three beams have a narrower beamwidth than the one or more layer one beams. In some examples, the switch request is for switching between two layer three beams based on a movement rate associated with the user position information being at or below a threshold value, and is for switching to a layer one beam based on the movement rate exceeding the threshold value.

In some examples, to support transmitting the beam request, the beamwidth manager 1145 may be configured as or otherwise support a means for transmitting a beamwidth update request to change a beamwidth of the first beam to be a wider beamwidth or a narrower beamwidth than an existing beamwidth of the first beam.

In some examples, the pose information manager 1135 may be configured as or otherwise support a means for identifying a set of pose parameters associated with the user position information. In some examples, the pose information manager 1135 may be configured as or otherwise support a means for determining the one or more requested beam parameters based on a mapping between the set of pose parameters and a set of available beam parameters. In some examples, the one or more requested beam parameters are based on an adaptive model of a channel between the UE and the base station and the set of pose parameters. In some examples, the set of available beam parameters are included in a codebook of beams provided by the base station. In some examples, the set of available beam parameters are determined at the UE based on measurements of received signals from the base station.

In some examples, the pose information manager 1135 may be configured as or otherwise support a means for storing a set of multiple measurements of one or more signals from the base station for a set of multiple different pose parameters associated with a set of multiple different user position information. In some examples, the pose information manager 1135 may be configured as or otherwise support a means for determining the one or more requested beam parameters based on one or more current pose parameters and the set of multiple measurements. In some examples, the one or more requested beam parameters indicate a request for a beamwidth adjustment of the first beam by a determined step value.

In some examples, the beamwidth manager 1145 may be configured as or otherwise support a means for measuring a reference signal that is transmitted using an adjusted first beam having the beamwidth adjustment. In some examples, the beamwidth manager 1145 may be configured as or otherwise support a means for determining, based on the measuring, to request a further beamwidth adjustment to further refine the first beam.

In some examples, the beam request includes one or more of a requested transmission configuration indicator (TCI) state associated with the first beam, the determined step value for beamwidth adjustment of the first beam, a relative direction between the UE and the base station, or any combinations thereof. In some examples, the beam request includes a request for a sequence of beams for two or more future time periods, based on predictive user position information associated with the two or more future time periods. In some examples, the predictive user position information is determined at a beam prediction engine based on a set of predicted pose parameters provided by the extended reality application running at an application layer of the UE.

In some examples, the beam configuration manager 1130 may be configured as or otherwise support a means for receiving, from the base station, configuration information that enables transmission of the beam request based on the user position information, and that configures shared channel or control channel signaling for communication of beam requests and beam configurations.

Figure 12:
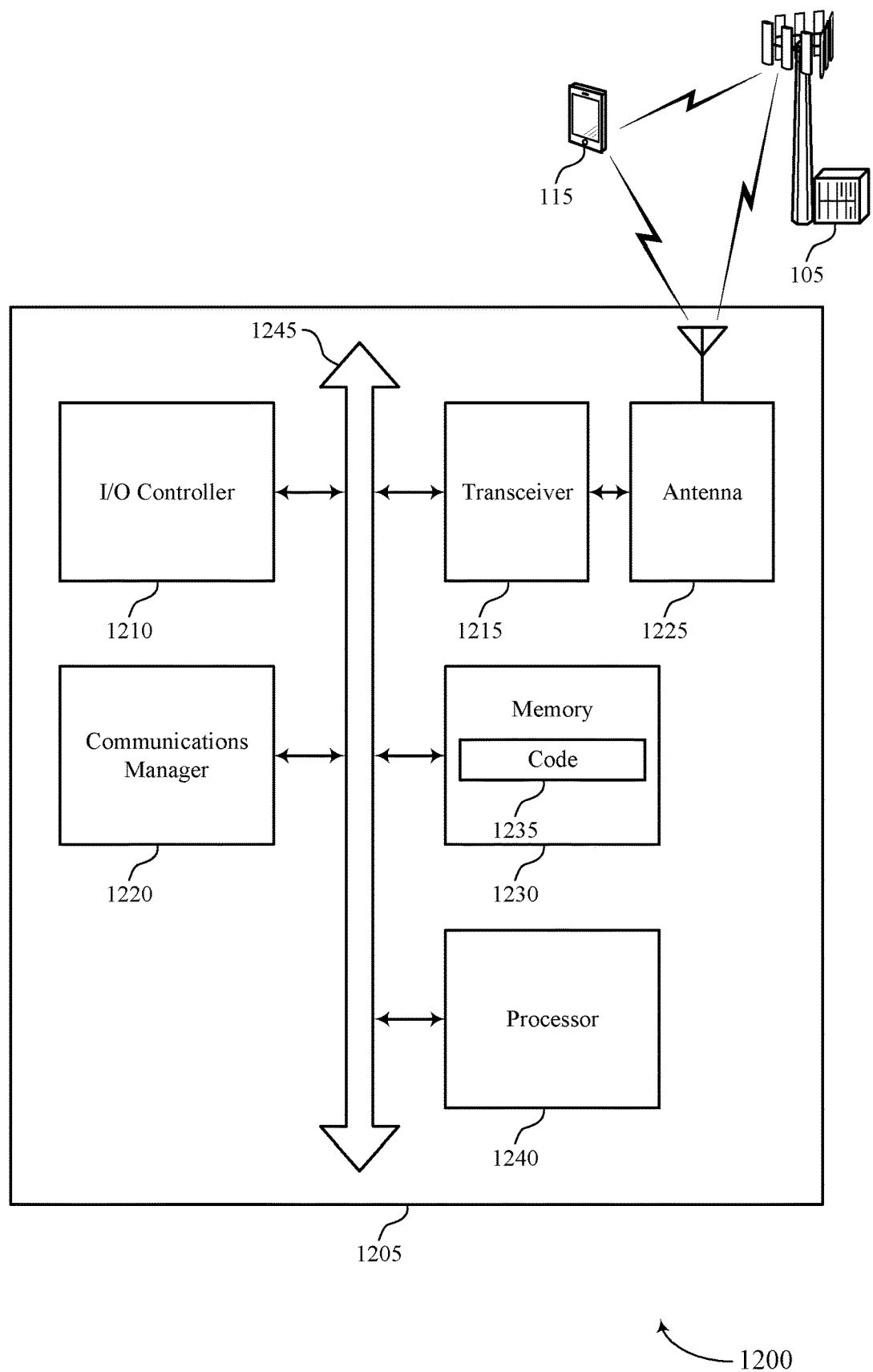
FIG. 12 shows a diagram of a system including a device that supports pose-based beamforming techniques for wireless communications in accordance with aspects of the present disclosure.

FIG. 12 shows a diagram of a system 1200 including a device 1205 that supports pose-based beamforming techniques for wireless communications in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting pose-based beamforming techniques for wireless communications). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for transmitting, to a base station, a beam request for a first beam having one or more requested beam parameters for beamformed communications between the base station and the UE, the requested beam parameters based on user position information associated with an extended reality application at the UE. The communications manager 1220 may be configured as or otherwise support a means for receiving, from the base station, a first beam configuration responsive to the beam request. The communications manager 1220 may be configured as or otherwise support a means for communicating with the base station using the first beam configuration.

By including or configuring the communications manager 1220 in accordance with examples as described herein, the device 1205 may support techniques for pose-based beam adjustments that provide enhanced reliability and lower latency for XR-related operations, and enhanced user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of pose-based beamforming techniques for wireless communications as described herein, or the processor 1240 and the memory 1230 may be otherwise configured to perform or support such operations.

Figure 13:
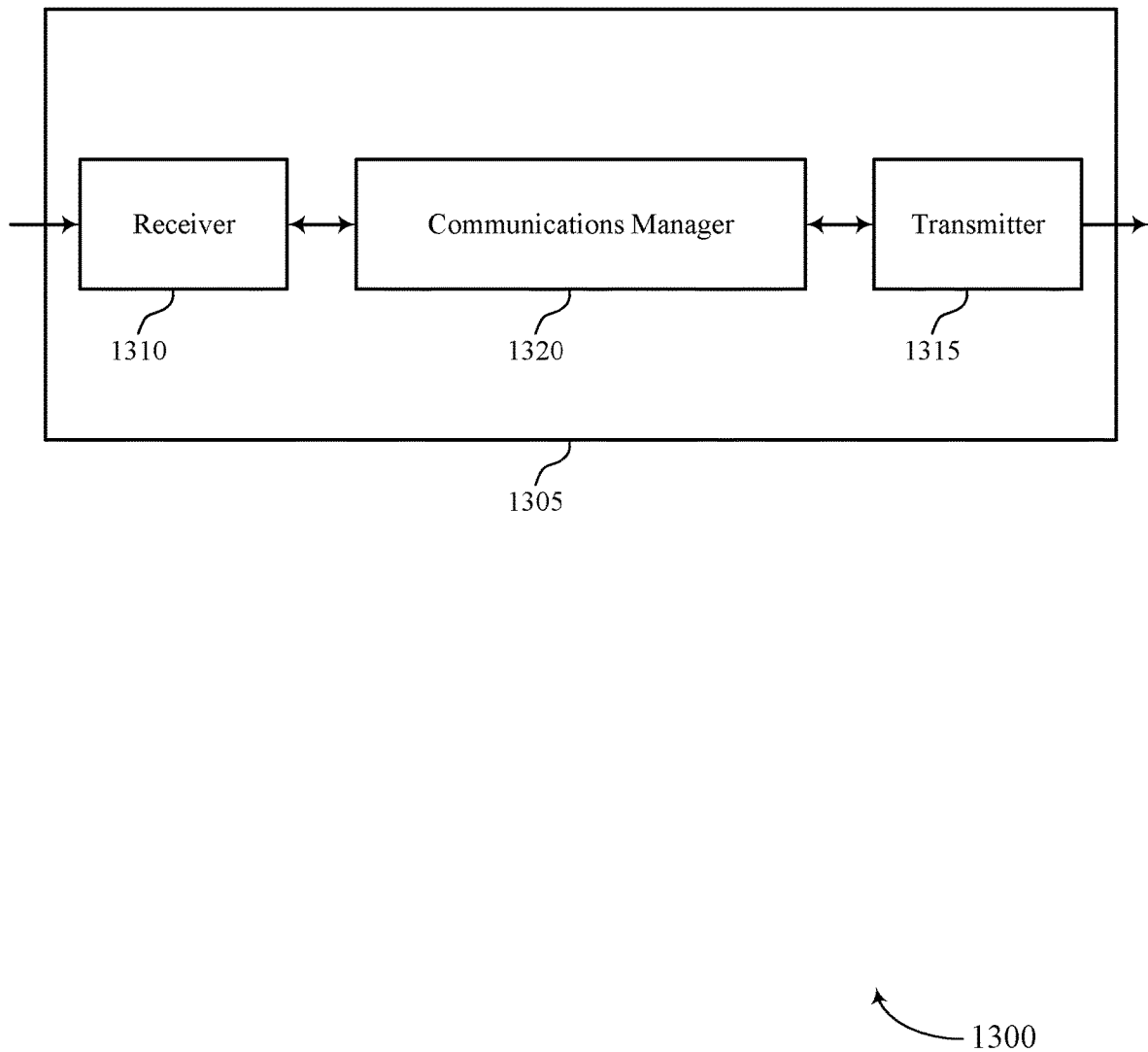
FIGS. 13 and 14 show block diagrams of devices that support pose-based beamforming techniques for wireless communications in accordance with aspects of the present disclosure.

FIG. 13 shows a block diagram 1300 of a device 1305 that supports pose-based beamforming techniques for wireless communications in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to pose-based beamforming techniques for wireless communications). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to pose-based beamforming techniques for wireless communications). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of pose-based beamforming techniques for wireless communications as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. For example, the communications manager 1320 may be configured as or otherwise support a means for receiving, from a UE, a beam request for a first beam having one or more requested beam parameters for beamformed communications with the UE, the requested beam parameters based on user position information associated with an extended reality application at the UE. The communications manager 1320 may be configured as or otherwise support a means for transmitting, to the UE, a first beam configuration responsive to the beam request. The communications manager 1320 may be configured as or otherwise support a means for communicating with the UE using the first beam configuration.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for pose-based beam adjustments that provide enhanced reliability and lower latency for XR-related operations, and enhanced user experience.

Figure 14:
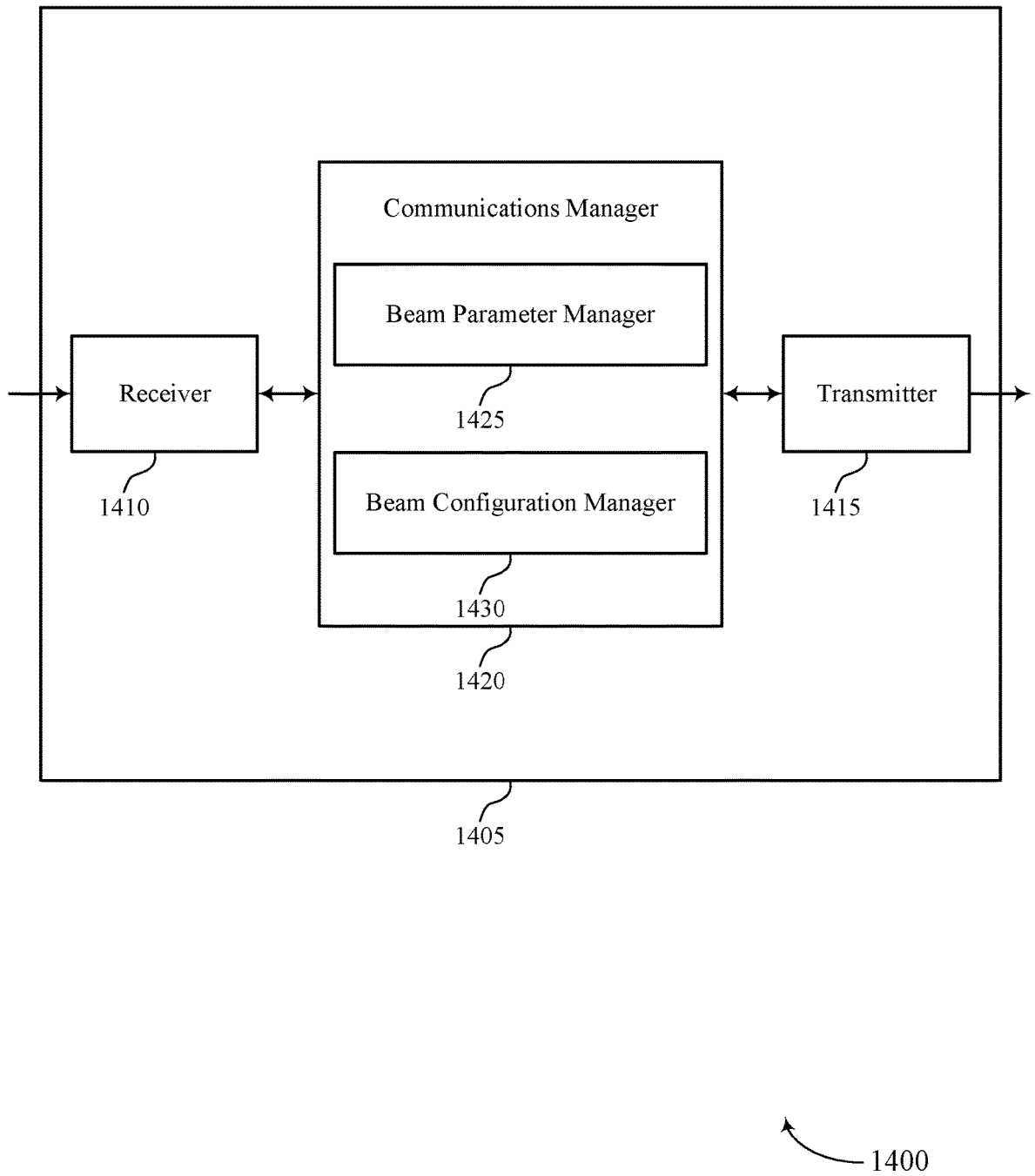

FIG. 14 shows a block diagram 1400 of a device 1405 that supports pose-based beamforming techniques for wireless communications in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to pose-based beamforming techniques for wireless communications). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to pose-based beamforming techniques for wireless communications). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of pose-based beamforming techniques for wireless communications as described herein. For example, the communications manager 1420 may include a beam parameter manager 1425 a beam configuration manager 1430, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. The beam parameter manager 1425 may be configured as or otherwise support a means for receiving, from a UE, a beam request for a first beam having one or more requested beam parameters for beamformed communications with the UE, the requested beam parameters based on user position information associated with an extended reality application at the UE. The beam configuration manager 1430 may be configured as or otherwise support a means for transmitting, to the UE, a first beam configuration responsive to the beam request. The beam configuration manager 1430 may be configured as or otherwise support a means for communicating with the UE using the first beam configuration.

Figure 15:
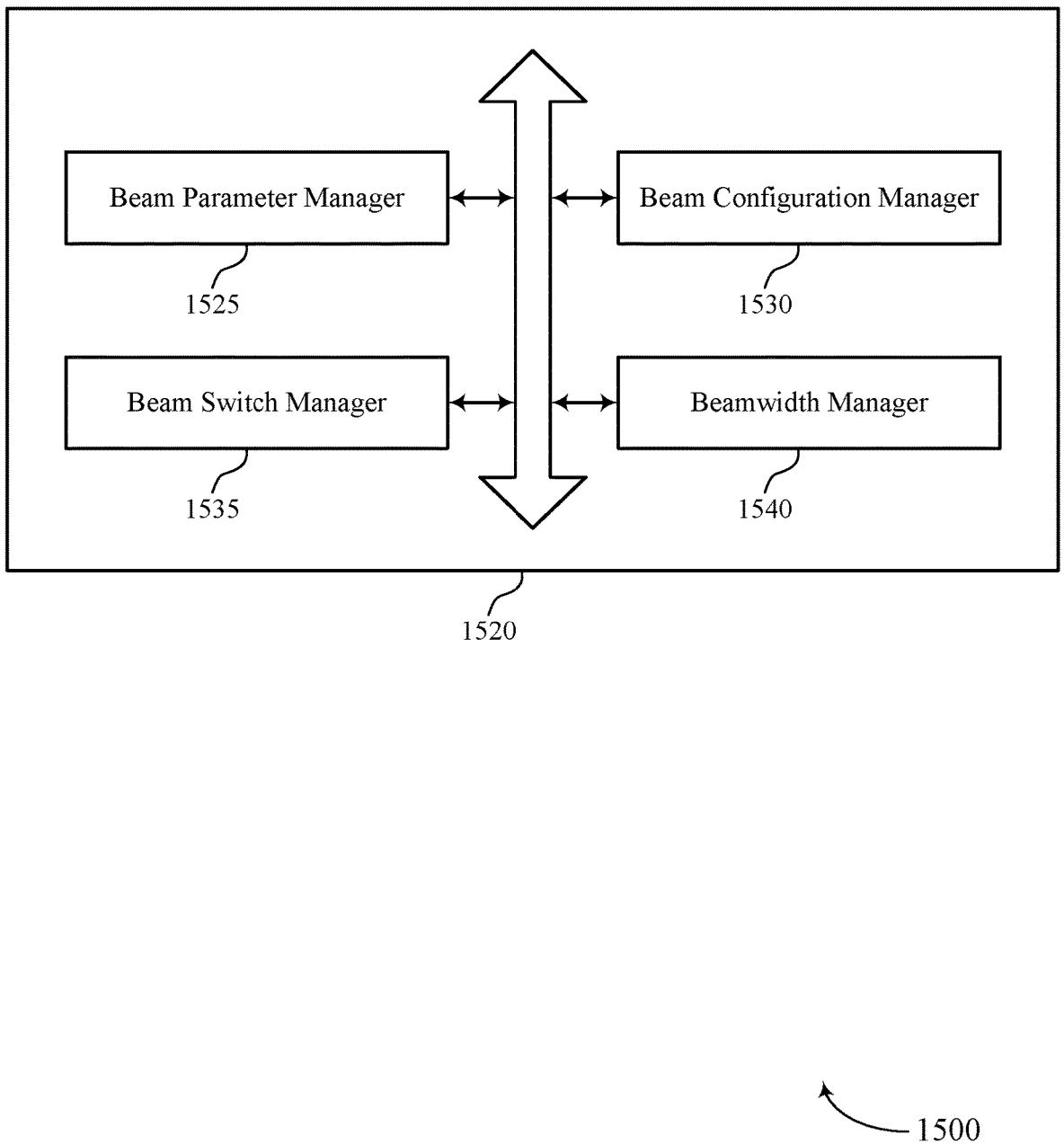
FIG. 15 shows a block diagram of a communications manager that supports pose-based beamforming techniques for wireless communications in accordance with aspects of the present disclosure.

FIG. 15 shows a block diagram 1500 of a communications manager 1520 that supports pose-based beamforming techniques for wireless communications in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of pose-based beamforming techniques for wireless communications as described herein. For example, the communications manager 1520 may include a beam parameter manager 1525, a beam configuration manager 1530, a beam switch manager 1535, a beamwidth manager 1540, or any combination thereof. Each of these components may communicate, directly or indirectly, with one another (e.g., via one or more buses).

The communications manager 1520 may support wireless communications at a base station in accordance with examples as disclosed herein. The beam parameter manager 1525 may be configured as or otherwise support a means for receiving, from a UE, a beam request for a first beam having one or more requested beam parameters for beamformed communications with the UE, the requested beam parameters based on user position information associated with an extended reality application at the UE. The beam configuration manager 1530 may be configured as or otherwise support a means for transmitting, to the UE, a first beam configuration responsive to the beam request. In some examples, the beam configuration manager 1530 may be configured as or otherwise support a means for communicating with the UE using the first beam configuration.

In some examples, the beam request includes a request for two or more beams for two or more future time periods. In some examples, the beam request includes a switch request to switch from an existing beam to the first beam, where the existing beam and the first beam are included in a set of multiple configured beams of the base station that include one or more layer one beams, one or more layer three beams, or any combinations thereof, and where the one or more layer three beams have a narrower beamwidth than the one or more layer one beams. In some examples, the beam request includes a request to change a beamwidth of the first beam to be a wider beamwidth or a narrower beamwidth than an existing beamwidth of the first beam. In some examples, the first beam configuration is determined based on an iterative process of beamwidth adjustments using a determined step value of beamwidth changes for each iteration of the iterative process.

Figure 16:
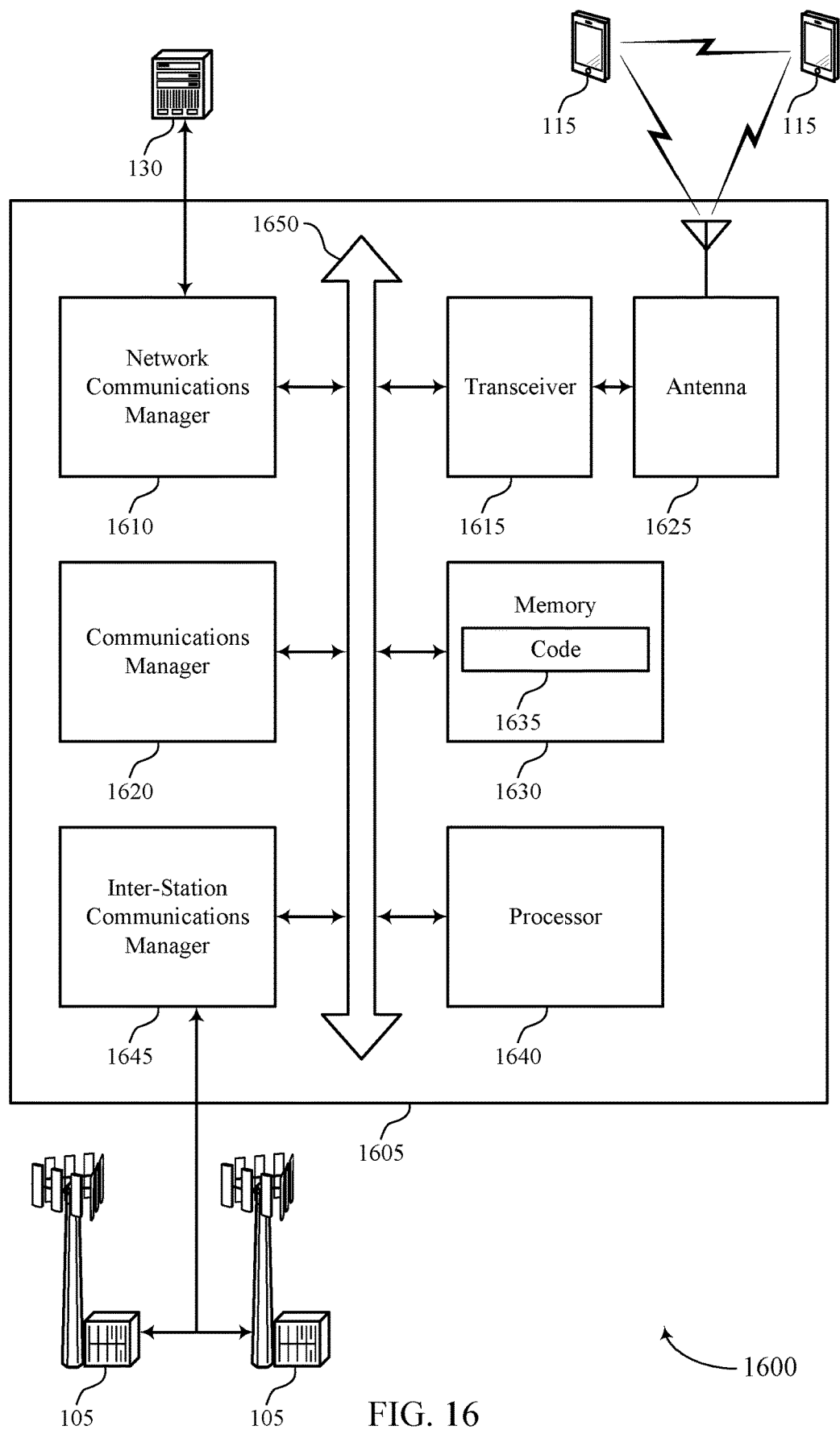
FIG. 16 shows a diagram of a system including a device that supports pose-based beamforming techniques for wireless communications in accordance with aspects of the present disclosure.

FIG. 16 shows a diagram of a system 1600 including a device 1605 that supports pose-based beamforming techniques for wireless communications in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting pose-based beamforming techniques for wireless communications). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a base station in accordance with examples as disclosed herein. For example, the communications manager 1620 may be configured as or otherwise support a means for receiving, from a UE, a beam request for a first beam having one or more requested beam parameters for beamformed communications with the UE, the requested beam parameters based on user position information associated with an extended reality application at the UE. The communications manager 1620 may be configured as or otherwise support a means for transmitting, to the UE, a first beam configuration responsive to the beam request. The communications manager 1620 may be configured as or otherwise support a means for communicating with the UE using the first beam configuration.

By including or configuring the communications manager 1620 in accordance with examples as described herein, the device 1605 may support techniques for pose-based beam adjustments that provide enhanced reliability and lower latency for XR-related operations, and enhanced user experience.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of pose-based beamforming techniques for wireless communications as described herein, or the processor 1640 and the memory 1630 may be otherwise configured to perform or support such operations.

Figure 17:
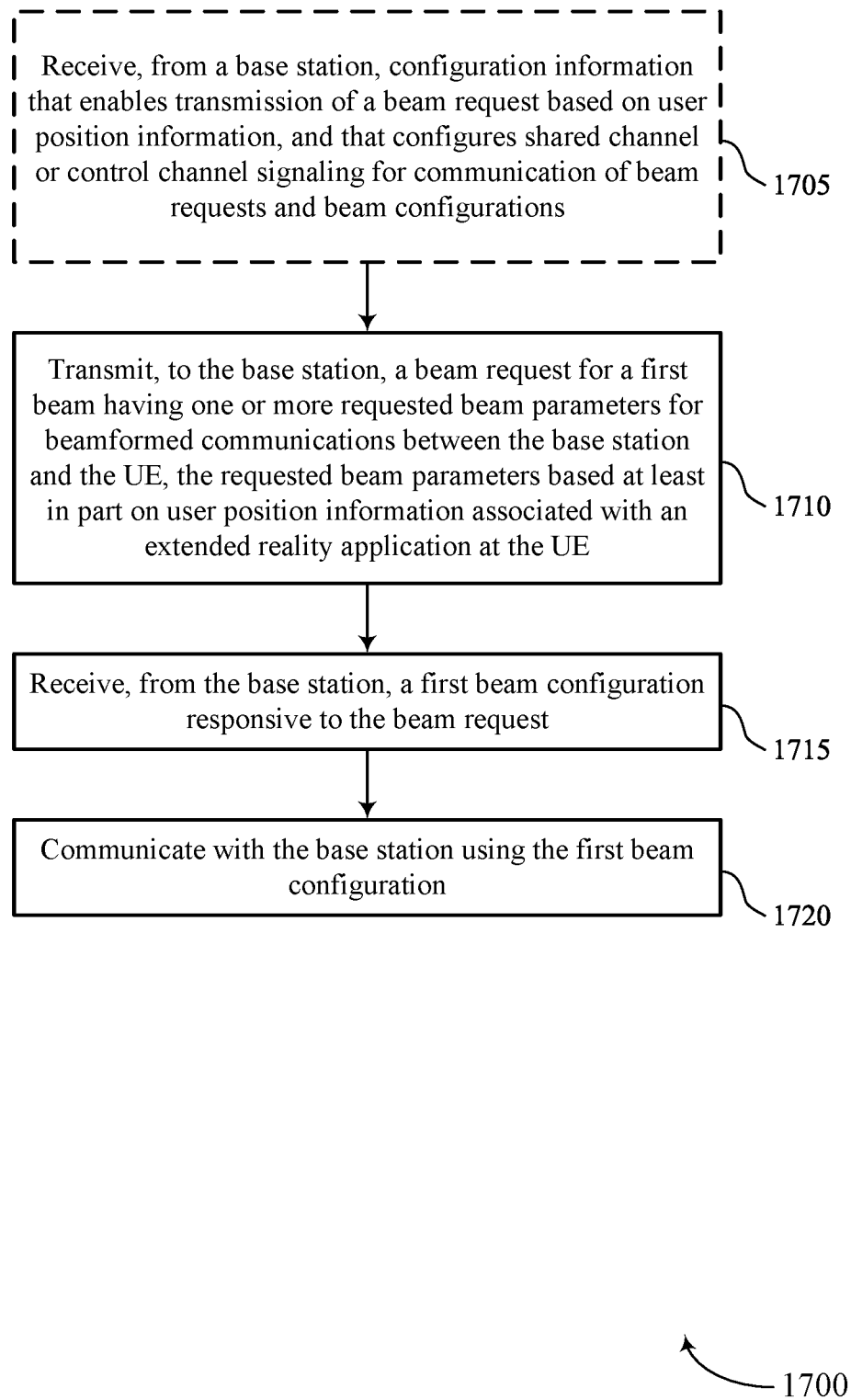
FIGS. 17 through 21 show flowcharts illustrating methods that support pose-based beamforming techniques for wireless communications in accordance with aspects of the present disclosure.

FIG. 17 shows a flowchart illustrating a method 1700 that supports pose-based beamforming techniques for wireless communications in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving, from the base station, configuration information that enables transmission of the beam request based on the user position information, and that configures shared channel or control channel signaling for communication of beam requests and beam configurations. The operations of 1705 may be performed in accordance with examples as disclosed herein. In some examples, aspects of the operations of 1705 may be performed by a beam configuration manager 1130 as described with reference to FIG. 11.

At 1710, the method may include transmitting, to a base station, a beam request for a first beam having one or more requested beam parameters for beamformed communications between the base station and the UE, the requested beam parameters based on user position information associated with an extended reality application at the UE. The operations of 1710 may be performed in accordance with examples as disclosed herein. In some examples, aspects of the operations of 1710 may be performed by a beam parameter manager 1125 as described with reference to FIG. 11. In some cases, the user position information includes pose parameters provided by the extended reality application that include one or more of position information of the UE relative to a reference position, orientation information of the UE relative to a reference orientation, rotational movement information of the UE relative to one or more axes of rotation, translational movement information relative to one or more axes of translation, or any combinations thereof. In some cases, the pose parameters include one or more current pose parameters for a current time period, one or more predictive pose parameters for one or more future time periods, or any combinations thereof.

In some cases, a switch request may be transmitted to switch from an existing beam to the first beam, where the existing beam and the first beam are included in a set of multiple configured base station beams that include one or more layer one beams, one or more layer three beams, or any combinations thereof, and where the one or more layer three beams have a narrower beamwidth than the one or more layer one beams. In some cases, the switch request is for switching between two layer three beams based on a movement rate associated with the user position information being at or below a threshold value, and is for switching to a layer one beam based on the movement rate exceeding the threshold value.

In some cases, a beamwidth update request may be transmitted to change a beamwidth of the first beam to be a wider beamwidth or a narrower beamwidth than an existing beamwidth of the first beam. In some cases, the beam request may be a request for a sequence of beams for two or more future time periods, based on predictive user position information associated with the two or more future time periods. In some cases, the predictive user position information is determined at a beam prediction engine based on a set of predicted pose parameters provided by the extended reality application running at an application layer of the UE.

At 1715, the method may include receiving, from the base station, a first beam configuration responsive to the beam request. The operations of 1715 may be performed in accordance with examples as disclosed herein. In some examples, aspects of the operations of 1715 may be performed by a beam configuration manager 1130 as described with reference to FIG. 11.

At 1720, the method may include communicating with the base station using the first beam configuration. The operations of 1720 may be performed in accordance with examples as disclosed herein. In some examples, aspects of the operations of 1720 may be performed by a beam configuration manager 1130 as described with reference to FIG. 11.

Figure 18:
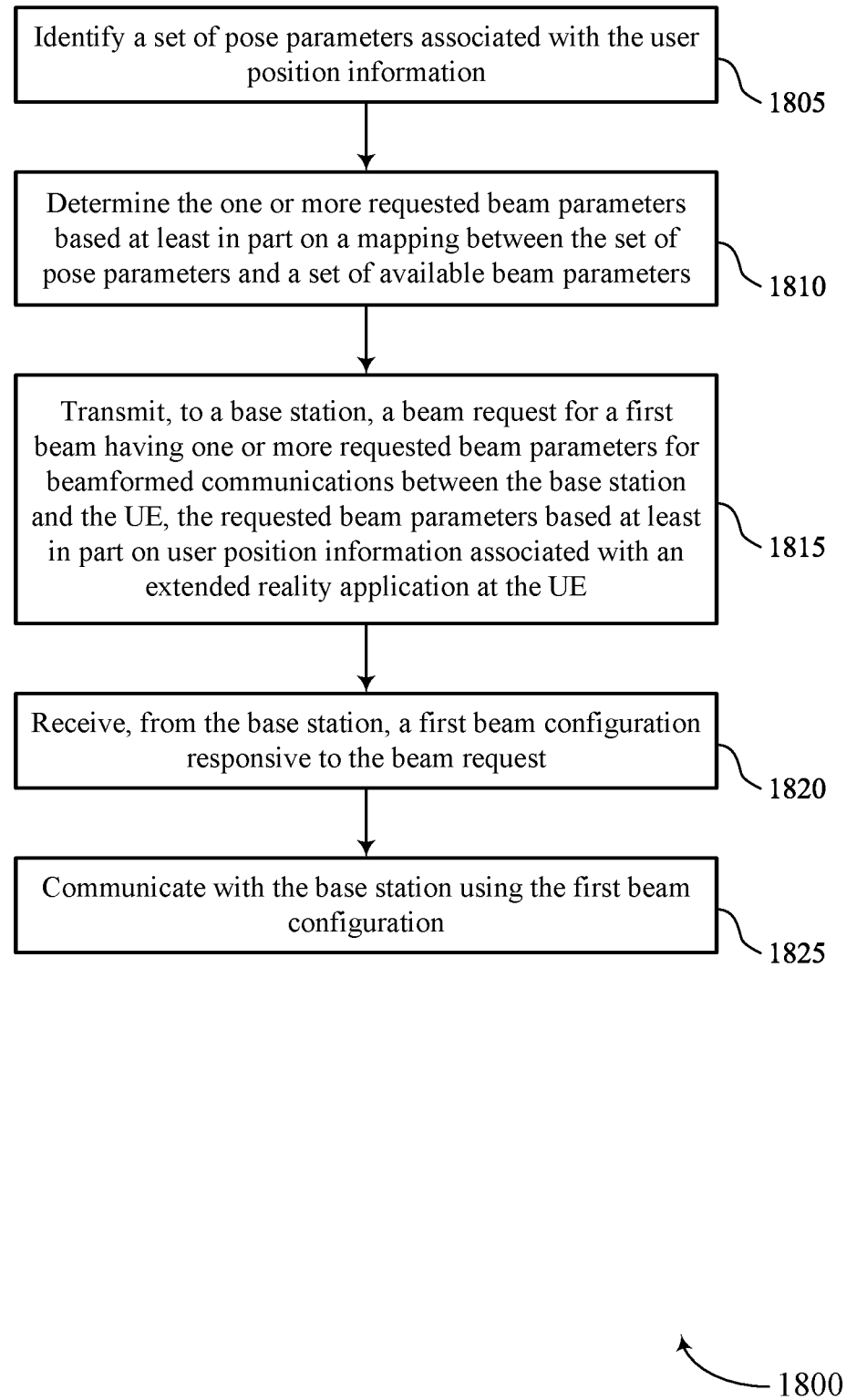

FIG. 18 shows a flowchart illustrating a method 1800 that supports pose-based beamforming techniques for wireless communications in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include identifying a set of pose parameters associated with the user position information. The operations of 1805 may be performed in accordance with examples as disclosed herein. In some examples, aspects of the operations of 1805 may be performed by a pose information manager 1135 as described with reference to FIG. 11.

At 1810, the method may include determining the one or more requested beam parameters based on a mapping between the set of pose parameters and a set of available beam parameters. The operations of 1810 may be performed in accordance with examples as disclosed herein. In some examples, aspects of the operations of 1810 may be performed by a pose information manager 1135 as described with reference to FIG. 11. In some cases, the one or more requested beam parameters may be based on an adaptive model of a channel between the UE and the base station and the set of pose parameters. In some cases, the set of available beam parameters are included in a codebook of beams provided by the base station. In some cases, the set of available beam parameters are determined at the UE based on measurements of received signals from the base station.

At 1815, the method may include transmitting, to a base station, a beam request for a first beam having one or more requested beam parameters for beamformed communications between the base station and the UE, the requested beam parameters based on user position information associated with an extended reality application at the UE. The operations of 1815 may be performed in accordance with examples as disclosed herein. In some examples, aspects of the operations of 1815 may be performed by a beam parameter manager 1125 as described with reference to FIG. 11.

At 1820, the method may include receiving, from the base station, a first beam configuration responsive to the beam request. The operations of 1820 may be performed in accordance with examples as disclosed herein. In some examples, aspects of the operations of 1820 may be performed by a beam configuration manager 1130 as described with reference to FIG. 11.

At 1825, the method may include communicating with the base station using the first beam configuration. The operations of 1825 may be performed in accordance with examples as disclosed herein. In some examples, aspects of the operations of 1825 may be performed by a beam configuration manager 1130 as described with reference to FIG. 11.

Figure 19:
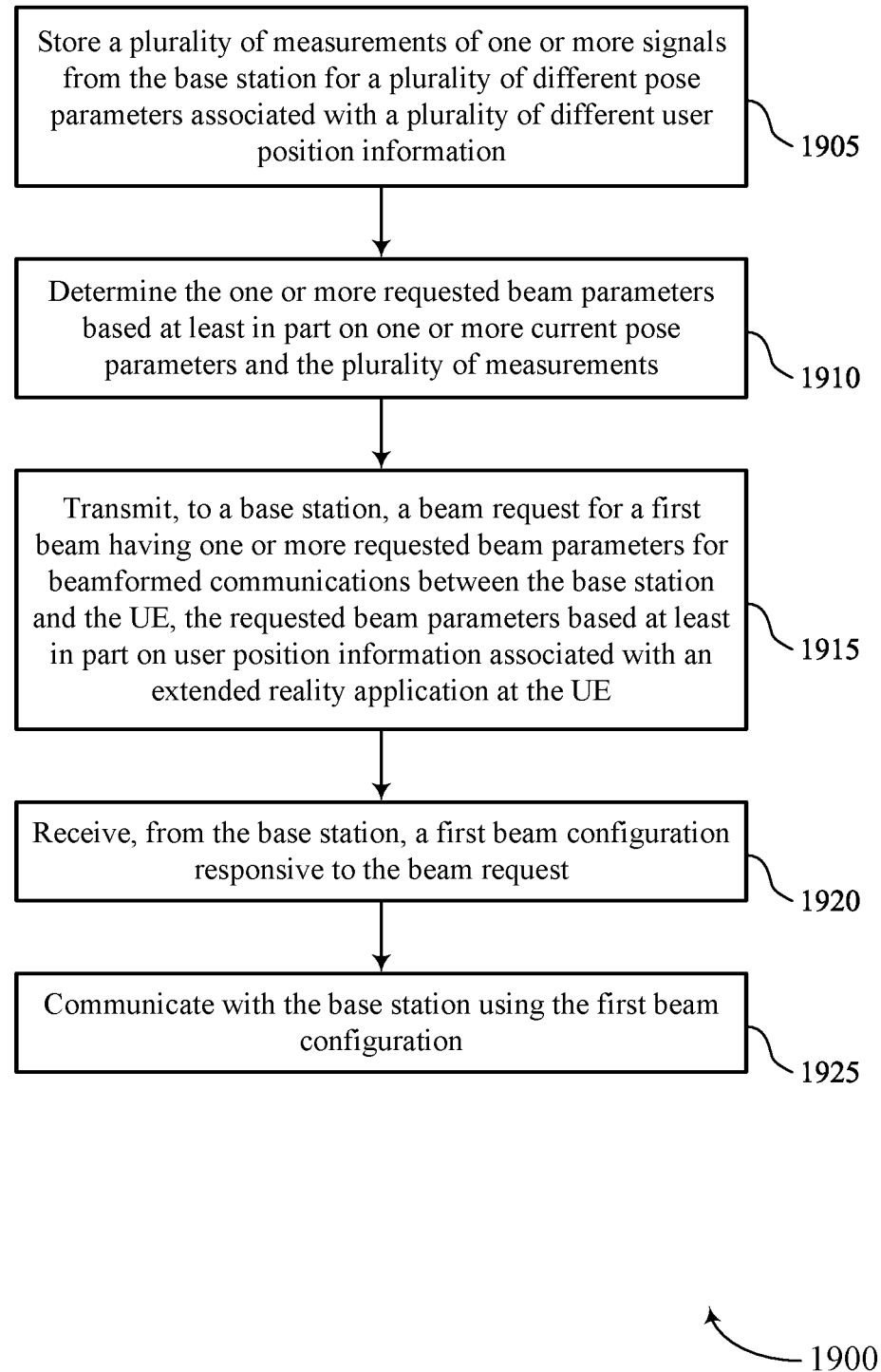

FIG. 19 shows a flowchart illustrating a method 1900 that supports pose-based beamforming techniques for wireless communications in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include storing a set of multiple measurements of one or more signals from the base station for a set of multiple different pose parameters associated with a set of multiple different user position information. The operations of 1905 may be performed in accordance with examples as disclosed herein. In some examples, aspects of the operations of 1905 may be performed by a pose information manager 1135 as described with reference to FIG. 11.

At 1910, the method may include determining the one or more requested beam parameters based on one or more current pose parameters and the set of multiple measurements. The operations of 1910 may be performed in accordance with examples as disclosed herein. In some examples, aspects of the operations of 1910 may be performed by a pose information manager 1135 as described with reference to FIG. 11.

At 1915, the method may include transmitting, to a base station, a beam request for a first beam having one or more requested beam parameters for beamformed communications between the base station and the UE, the requested beam parameters based on user position information associated with an extended reality application at the UE. The operations of 1915 may be performed in accordance with examples as disclosed herein. In some examples, aspects of the operations of 1915 may be performed by a beam parameter manager 1125 as described with reference to FIG. 11.

At 1920, the method may include receiving, from the base station, a first beam configuration responsive to the beam request. The operations of 1920 may be performed in accordance with examples as disclosed herein. In some examples, aspects of the operations of 1920 may be performed by a beam configuration manager 1130 as described with reference to FIG. 11.

At 1925, the method may include communicating with the base station using the first beam configuration. The operations of 1925 may be performed in accordance with examples as disclosed herein. In some examples, aspects of the operations of 1925 may be performed by a beam configuration manager 1130 as described with reference to FIG. 11.

Figure 20:
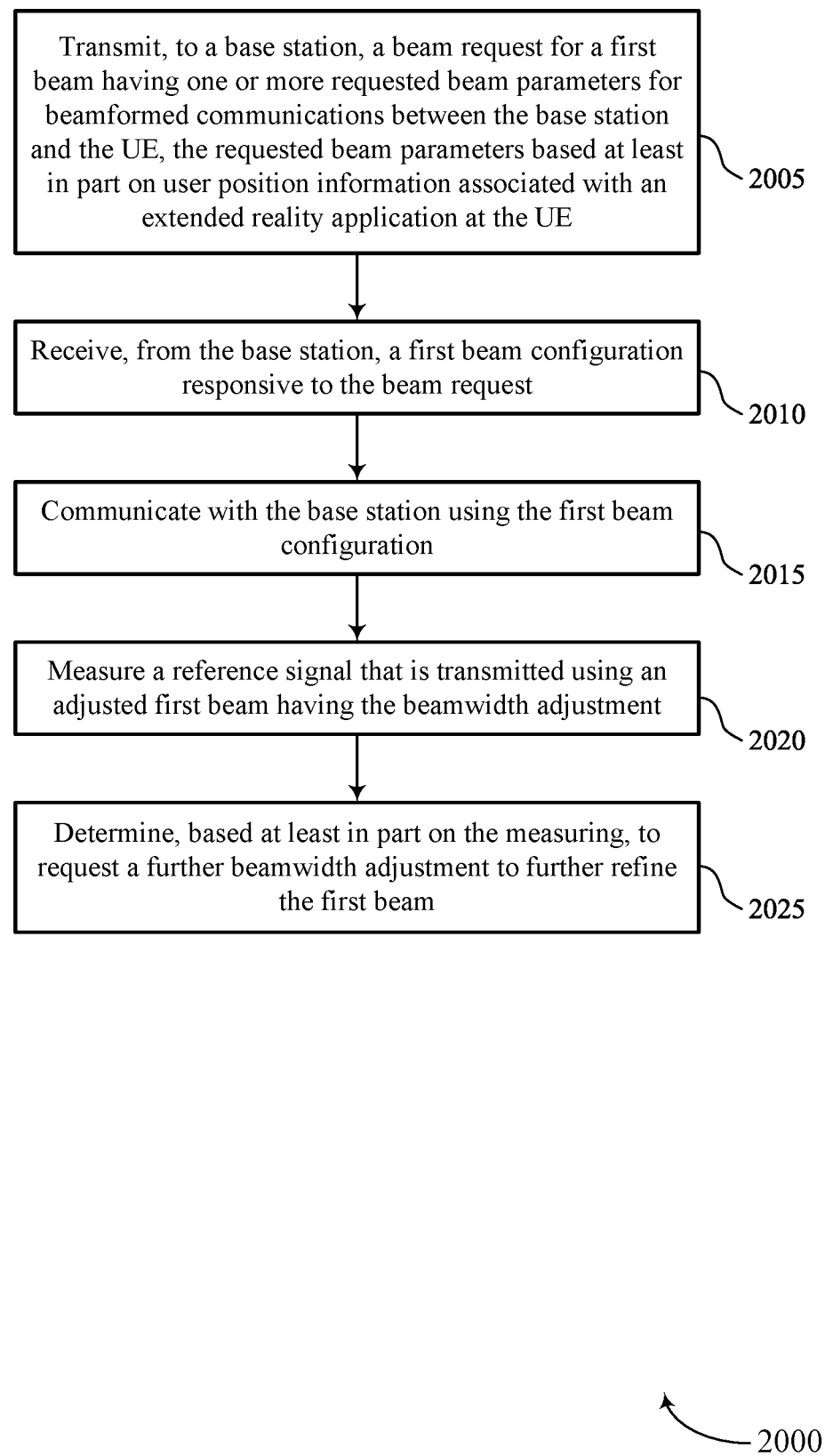

FIG. 20 shows a flowchart illustrating a method 2000 that supports pose-based beamforming techniques for wireless communications in accordance with aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2005, the method may include transmitting, to a base station, a beam request for a first beam having one or more requested beam parameters for beamformed communications between the base station and the UE, the requested beam parameters based on user position information associated with an extended reality application at the UE. The operations of 2005 may be performed in accordance with examples as disclosed herein. In some examples, aspects of the operations of 2005 may be performed by a beam parameter manager 1125 as described with reference to FIG. 11. In some cases, the one or more requested beam parameters indicate a request for a beamwidth adjustment of the first beam by a determined step value. In some cases, the beam request includes one or more of a requested TCI state associated with the first beam, the determined step value for beamwidth adjustment of the first beam, a relative direction between the UE and the base station, or any combinations thereof.

At 2010, the method may include receiving, from the base station, a first beam configuration responsive to the beam request. The operations of 2010 may be performed in accordance with examples as disclosed herein. In some examples, aspects of the operations of 2010 may be performed by a beam configuration manager 1130 as described with reference to FIG. 11.

At 2015, the method may include communicating with the base station using the first beam configuration. The operations of 2015 may be performed in accordance with examples as disclosed herein. In some examples, aspects of the operations of 2015 may be performed by a beam configuration manager 1130 as described with reference to FIG. 11.

At 2020, the method may include measuring a reference signal that is transmitted using an adjusted first beam having the beamwidth adjustment. The operations of 2020 may be performed in accordance with examples as disclosed herein. In some examples, aspects of the operations of 2020 may be performed by a beamwidth manager 1145 as described with reference to FIG. 11.

At 2025, the method may include determining, based on the measuring, to request a further beamwidth adjustment to further refine the first beam. The operations of 2025 may be performed in accordance with examples as disclosed herein. In some examples, aspects of the operations of 2025 may be performed by a beamwidth manager 1145 as described with reference to FIG. 11.

Figure 21:
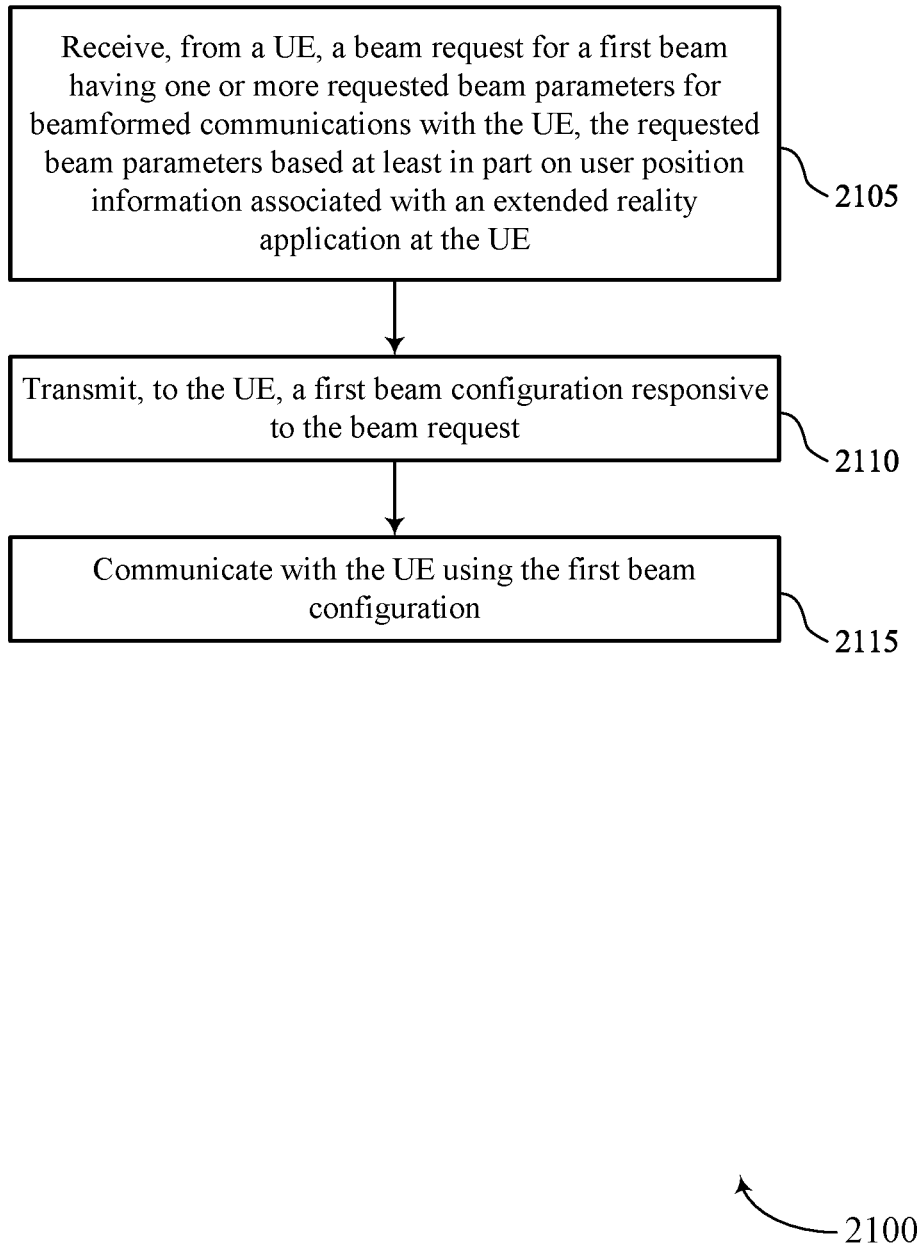

FIG. 21 shows a flowchart illustrating a method 2100 that supports pose-based beamforming techniques for wireless communications in accordance with aspects of the present disclosure. The operations of the method 2100 may be implemented by a base station or its components as described herein. For example, the operations of the method 2100 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2105, the method may include receiving, from a UE, a beam request for a first beam having one or more requested beam parameters for beamformed communications with the UE, the requested beam parameters based on user position information associated with an extended reality application at the UE. The operations of 2105 may be performed in accordance with examples as disclosed herein. In some examples, aspects of the operations of 2105 may be performed by a beam parameter manager 1525 as described with reference to FIG. 15. In some cases, the beam request may include a request for two or more beams for two or more future time periods. In some cases, the beam request includes a switch request to switch from an existing beam to the first beam, where the existing beam and the first beam are included in a set of multiple configured beams of the base station that include one or more layer one beams, one or more layer three beams, or any combinations thereof, and where the one or more layer three beams have a narrower beamwidth than the one or more layer one beams. In some cases, the beam request includes a request to change a beamwidth of the first beam to be a wider beamwidth or a narrower beamwidth than an existing beamwidth of the first beam.

At 2110, the method may include transmitting, to the UE, a first beam configuration responsive to the beam request. The operations of 2110 may be performed in accordance with examples as disclosed herein. In some examples, aspects of the operations of 2110 may be performed by a beam configuration manager 1530 as described with reference to FIG. 15. In some cases, the first beam configuration is determined based on an iterative process of beamwidth adjustments using a determined step value of beamwidth changes for each iteration of the iterative process.

At 2115, the method may include communicating with the UE using the first beam configuration. The operations of 2115 may be performed in accordance with examples as disclosed herein. In some examples, aspects of the operations of 2115 may be performed by a beam configuration manager 1530 as described with reference to FIG. 15.

The following provides an overview of aspects of the present disclosure:

Aspect 1: A method for wireless communications at a UE, comprising: transmitting, to a base station, a beam request for a first beam having one or more requested beam parameters for beamformed communications between the base station and the UE, the requested beam parameters based at least in part on user position information associated with an extended reality application at the UE; receiving, from the base station, a first beam configuration responsive to the beam request; and communicating with the base station using the first beam configuration.

Aspect 2: The method of aspect 1, wherein the user position information includes pose parameters provided by the extended reality application that comprise one or more of position information of the UE relative to a reference position, orientation information of the UE relative to a reference orientation, rotational movement information of the UE relative to one or more axes of rotation, translational movement information relative to one or more axes of translation, or any combinations thereof.

Aspect 3: The method of aspect 2, wherein the pose parameters include one or more current pose parameters for a current time period, one or more predictive pose parameters for one or more future time periods, or any combinations thereof.

Aspect 4: The method of any of aspects 1 through 3, wherein the transmitting the beam request comprises: transmitting a switch request to switch from an existing beam to the first beam, wherein the existing beam and the first beam are included in a plurality of configured base station beams that include one or more layer one beams, one or more layer three beams, or any combinations thereof, and wherein the one or more layer three beams have a narrower beamwidth than the one or more layer one beams.

Aspect 5: The method of aspect 4, wherein the switch request is for switching between two layer three beams based at least in part on a movement rate associated with the user position information being at or below a threshold value, and is for switching to a layer one beam based at least in part on the movement rate exceeding the threshold value.

Aspect 6: The method of aspect 1, wherein the transmitting the beam request comprises: transmitting a beamwidth update request to change a beamwidth of the first beam to be a wider beamwidth or a narrower beamwidth than an existing beamwidth of the first beam.

Aspect 7: The method of any of aspects 1 through 6, further comprising: identifying a set of pose parameters associated with the user position information; and determining the one or more requested beam parameters based at least in part on a mapping between the set of pose parameters and a set of available beam parameters.

Aspect 8: The method of aspect 7, wherein the one or more requested beam parameters are based at least in part on an adaptive model of a channel between the UE and the base station and the set of pose parameters.

Aspect 9: The method of any of aspects 7 through 8, wherein the set of available beam parameters are included in a codebook of beams provided by the base station.

Aspect 10: The method of any of aspects 7 through 9, wherein the set of available beam parameters are determined at the UE based at least in part on measurements of received signals from the base station.

Aspect 11: The method of any of aspects 1 through 10, further comprising: storing a plurality of measurements of one or more signals from the base station for a plurality of different pose parameters associated with a plurality of different user position information, and determining the one or more requested beam parameters based at least in part on one or more current pose parameters and the plurality of measurements.

Aspect 12: The method of aspect 1, wherein the one or more requested beam parameters indicate a request for a beamwidth adjustment of the first beam by a determined step value.

Aspect 13: The method of aspect 12, further comprising: measuring a reference signal that is transmitted using an adjusted first beam having the beamwidth adjustment; and determining, based at least in part on the measuring, to request a further beamwidth adjustment to further refine the first beam.

Aspect 14: The method of aspect 13, wherein the beam request includes one or more of a requested transmission configuration indicator (TCI) state associated with the first beam, the determined step value for beamwidth adjustment of the first beam, a relative direction between the UE and the base station, or any combinations thereof.

Aspect 15: The method of any of aspects 1 through 14, wherein the beam request includes a request for a sequence of beams for two or more future time periods, based at least in part on predictive user position information associated with the two or more future time periods.

Aspect 16: The method of aspect 15, wherein the predictive user position information is determined at a beam prediction engine based on a set of predicted pose parameters provided by the extended reality application running at an application layer of the UE.

Aspect 17: The method of any of aspects 1 through 16, further comprising: receiving, from the base station, configuration information that enables transmission of the beam request based at least in part on the user position information, and that configures shared channel or control channel signaling for communication of beam requests and beam configurations.

Aspect 18: A method for wireless communications at a base station, comprising: receiving, from a UE, a beam request for a first beam having one or more requested beam parameters for beamformed communications with the UE, the requested beam parameters based at least in part on user position information associated with an extended reality application at the UE; transmitting, to the UE, a first beam configuration responsive to the beam request; and communicating with the UE using the first beam configuration.

Aspect 19: The method of aspect 18, wherein the beam request includes a request for two or more beams for two or more future time periods.

Aspect 20: The method of any of aspects 18 through 19, wherein the beam request includes a switch request to switch from an existing beam to the first beam, wherein the existing beam and the first beam are included in a plurality of configured beams of the base station that include one or more layer one beams, one or more layer three beams, or any combinations thereof, and wherein the one or more layer three beams have a narrower beamwidth than the one or more layer one beams.

Aspect 21: The method of aspect 18, wherein the beam request includes a request to change a beamwidth of the first beam to be a wider beamwidth or a narrower beamwidth than an existing beamwidth of the first beam.

Aspect 22: The method of aspect 21, wherein the first beam configuration is determined based on an iterative process of beamwidth adjustments using a determined step value of beamwidth changes for each iteration of the iterative process.

Aspect 23: An apparatus for wireless communications at a UE, comprising a processor; memory coupled with the processor; and instructions stored in the memory and executable by the processor to cause the apparatus to perform a method of any of aspects 1 through 17.

Aspect 24: An apparatus for wireless communications at a UE, comprising at least one means for performing a method of any of aspects 1 through 17.

Aspect 25: A non-transitory computer-readable medium storing code for wireless communications at a UE, the code comprising instructions executable by a processor to perform a method of any of aspects 1 through 17.

Aspect 26: An apparatus for wireless communications at a base station, comprising a processor; memory coupled with the processor; and instructions stored in the memory and executable by the processor to cause the apparatus to perform a method of any of aspects 18 through 22.

Aspect 27: An apparatus for wireless communications at a base station, comprising at least one means for performing a method of any of aspects 18 through 22.

Aspect 28: A non-transitory computer-readable medium storing code for wireless communications at a base station, the code comprising instructions executable by a processor to perform a method of any of aspects 18 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    one or more processors;
    one or more memories coupled with the one or more processors; and
    instructions stored in the one or more memories and executable by the one or more processors to cause the apparatus to:
    transmit, to a base station, a beam request for a first beam having one or more requested beam parameters for beamformed communications between the base station and the UE, the requested beam parameters based at least in part on user position information associated with an extended reality application at the UE;
    receive, from the base station, a first beam configuration responsive to the beam request, wherein the first beam configuration is determined based on an iterative process of beamwidth adjustments using a determined step value of beamwidth changes for each iteration of the iterative process; and
    communicate with the base station using the first beam configuration.

2. The apparatus of claim 1, wherein the user position information includes pose parameters provided by the extended reality application that comprise one or more of orientation information of the UE relative to a reference orientation, rotational movement information of the UE relative to one or more axes of rotation, translational movement information relative to one or more axes of translation, distance information relative to one or more reference points, or any combinations thereof.

3. The apparatus of claim 2, wherein the pose parameters include one or more current pose parameters for a current time period, one or more predictive pose parameters for one or more future time periods, or any combinations thereof.

4. The apparatus of claim 1, wherein the instructions to transmit the beam request are executable by the processor to cause the apparatus to:
    transmit a switch request to switch from an existing beam to the first beam, wherein the existing beam and the first beam are included in a plurality of configured base station beams that include one or more layer one beams, one or more layer three beams, or any combinations thereof, and wherein the one or more layer three beams have a narrower beamwidth than the one or more layer one beams.

5. The apparatus of claim 4, wherein the switch request is for switching between two layer three beams based at least in part on a movement rate associated with the user position information being at or below a threshold value, and is for switching to a layer one beam based at least in part on the movement rate exceeding the threshold value.

6. The apparatus of claim 1, wherein the instructions are further executable by the processor to cause the apparatus to:
   identify a set of pose parameters associated with the user position information; and
   determine the one or more requested beam parameters based at least in part on a mapping between the set of pose parameters and a set of available beam parameters.

7. The apparatus of claim 6, wherein the one or more requested beam parameters are based at least in part on an adaptive model of a channel between the UE and the base station and the set of pose parameters.

8. The apparatus of claim 6, wherein the set of available beam parameters are included in a codebook of beams provided by the base station.

9. The apparatus of claim 6, wherein the set of available beam parameters are determined at the UE based at least in part on measurements of received signals from the base station.

10. The apparatus of claim 1, wherein the instructions are further executable by the processor to cause the apparatus to:
   store a plurality of measurements of one or more signals from the base station for a plurality of different pose parameters associated with a plurality of different user position information, and
   determine the one or more requested beam parameters based at least in part on one or more current pose parameters and the plurality of measurements.

11. The apparatus of claim 1, wherein the one or more requested beam parameters indicate a request for a beamwidth adjustment of the first beam by a step value.

12. The apparatus of claim 11, wherein the instructions are further executable by the processor to cause the apparatus to:
   measure a reference signal that is transmitted using an adjusted first beam having the beamwidth adjustment; and
   determine, based at least in part on the measuring, to request a further beamwidth adjustment to further refine the first beam.

13. The apparatus of claim 12, wherein the beam request includes one or more of a requested transmission configuration indicator (TCI) state associated with the first beam, the step value for beamwidth adjustment of the first beam, a relative direction between the UE and the base station, or any combinations thereof.

14. The apparatus of claim 1, wherein the beam request includes a request for a sequence of beams for two or more future time periods, based at least in part on predictive user position information associated with the two or more future time periods.

15. The apparatus of claim 14, wherein the predictive user position information is determined at a beam prediction engine based on a set of predicted pose parameters provided by the extended reality application running at an application layer of the UE.

16. The apparatus of claim 1, wherein the instructions are further executable by the processor to cause the apparatus to:
   receive, from the base station, configuration information that enables transmission of the beam request based at least in part on the user position information, and that configures shared channel or control channel signaling for communication of beam requests and beam configurations.

17. An apparatus for wireless communications at a base station, comprising:
   one or more processors;
   one or more memories coupled with the one or more processors; and
   instructions stored in the one or more memories and executable by the one or more processors to cause the apparatus to:
   receive, from a user equipment (UE), a beam request for a first beam having one or more requested beam parameters for beamformed communications with the UE, the requested beam parameters based at least in part on user position information associated with an extended reality application at the UE;
   transmit, to the UE, a first beam configuration responsive to the beam request, wherein the first beam configuration is determined based on an iterative process of beamwidth adjustments using a determined step value of beamwidth changes for each iteration of the iterative process; and
   communicate with the UE using the first beam configuration.

18. The apparatus of claim 17, wherein the beam request includes a request for two or more beams for two or more future time periods.

19. The apparatus of claim 17, wherein the beam request includes a switch request to switch from an existing beam to the first beam, wherein the existing beam and the first beam are included in a plurality of configured beams of the base station that include one or more layer one beams, one or more layer three beams, or any combinations thereof, and wherein the one or more layer three beams have a narrower beamwidth than the one or more layer one beams.

20. A method for wireless communications at a user equipment (UE), comprising:
   transmitting, to a base station, a beam request for a first beam having one or more requested beam parameters for beamformed communications between the base station and the UE, the requested beam parameters based at least in part on user position information associated with an extended reality application at the UE;
   receiving, from the base station, a first beam configuration responsive to the beam request, wherein the first beam configuration is determined based on an iterative process of beamwidth adjustments using a determined step value of beamwidth changes for each iteration of the iterative process; and
   communicating with the base station using the first beam configuration.

21. The method of claim 20, wherein the user position information includes pose parameters provided by the extended reality application that comprise one or more of orientation information of the UE relative to a reference orientation, rotational movement information of the UE relative to one or more axes of rotation, translational movement information relative to one or more axes of translation, distance information relative to one or more reference points, or any combinations thereof.

22. The method of claim 21, wherein the pose parameters include one or more current pose parameters for a current time period, one or more predictive pose parameters for one or more future time periods, or any combinations thereof.

23. The method of claim 20, wherein the transmitting the beam request comprises:
   transmitting a switch request to switch from an existing beam to the first beam, wherein the existing beam and the first beam are included in a plurality of configured base station beams that include one or more layer one beams, one or more layer three beams, or any combinations thereof, and wherein the one or more layer three beams have a narrower beamwidth than the one or more layer one beams.

24. A method for wireless communications at a base station, comprising:
receiving, from a user equipment (UE), a beam request for a first beam having one or more requested beam parameters for beamformed communications with the UE, the requested beam parameters based at least in part on user position information associated with an extended reality application at the UE;
transmitting, to the UE, a first beam configuration responsive to the beam request, wherein the first beam configuration is determined based on an iterative process of beamwidth adjustments using a determined step value of beamwidth changes for each iteration of the iterative process; and
communicating with the UE using the first beam configuration.

25. The method of claim 24, wherein the beam request includes a request for two or more beams for two or more future time periods.

26. The apparatus of claim 1, wherein the instructions to transmit the beam request are executable by the processor to cause the apparatus to:
transmit a beamwidth update request to change a beamwidth of the first beam to be a wider beamwidth or a narrower beamwidth than an existing beamwidth of the first beam.

27. The apparatus of claim 17, wherein the beam request includes a request to change a beamwidth of the first beam to be a wider beamwidth or a narrower beamwidth than an existing beamwidth of the first beam.

28. The method of claim 20, wherein the transmitting the beam request comprises:
transmitting a beamwidth update request to change a beamwidth of the first beam to be a wider beamwidth or a narrower beamwidth than an existing beamwidth of the first beam.

29. The method of claim 24, wherein the beam request includes a request to change a beamwidth of the first beam to be a wider beamwidth or a narrower beamwidth than an existing beamwidth of the first beam.

* * * * *